US012172497B2

(12) United States Patent
Yamashita et al.

(10) Patent No.: US 12,172,497 B2
(45) Date of Patent: Dec. 24, 2024

(54) AIR CONDITIONER FOR VEHICLE

(71) Applicant: SANDEN CORPORATION, Isesaki (JP)

(72) Inventors: Kouhei Yamashita, Isesaki (JP); Ryo Miyakoshi, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 195 days.

(21) Appl. No.: 17/911,540

(22) PCT Filed: Feb. 19, 2021

(86) PCT No.: PCT/JP2021/006341
§ 371 (c)(1),
(2) Date: Sep. 14, 2022

(87) PCT Pub. No.: WO2021/199776
PCT Pub. Date: Oct. 7, 2021

(65) Prior Publication Data
US 2023/0137140 A1 May 4, 2023

(30) Foreign Application Priority Data

Mar. 31, 2020 (JP) .................................. 2020-062764

(51) Int. Cl.
*B60H 1/32* (2006.01)
*B60H 1/00* (2006.01)

(52) U.S. Cl.
CPC .......... *B60H 1/323* (2013.01); *B60H 1/0073* (2019.05); *B60H 1/00885* (2013.01); *B60H 1/00921* (2013.01); *B60H 2001/00307* (2013.01)

(58) Field of Classification Search
CPC .. B60H 1/323; B60H 1/0073; B60H 1/00885; B60H 1/00921; B60H 2001/00307; B60H 1/00; F25B 2600/0253
See application file for complete search history.

(56) References Cited

U.S. PATENT DOCUMENTS 4,473,109 A * 9/1984 Kojima ............... G05D 23/1917
165/203
5,910,159 A * 6/1999 Matsuo ................... F28D 20/02
62/226
(Continued)

FOREIGN PATENT DOCUMENTS

CN 109328147 A 2/2019
DE 10 2007 055 006 A1 9/2008
(Continued)

OTHER PUBLICATIONS

German Patent and Trade Mark Office, First Office Action issued in German Patent Application No. 11 2021 000 505.7, dated Nov. 24, 2023 (16 pages).
(Continued)

*Primary Examiner* — David J Teitelbaum
(74) *Attorney, Agent, or Firm* — Baker Botts L.L.P.

(57) ABSTRACT

An air conditioner for a vehicle is provided which can realize suitable temperature control when having a plurality of evaporators even if the load in each evaporator fluctuates. An air conditioner 1 for a vehicle includes at least a compressor 2, a heat absorber 9 to evaporate a refrigerant, a refrigerant-heat medium heat exchanger 64, and a control device 11, and conditions air of a vehicle interior. The control device 11 calculates target numbers of revolutions TGNCc and TGNCcb of the compressor 2 required to control the temperature of the heat absorber 9 and the temperature of a heat medium cooled by the refrigerant-heat (Continued)

medium heat exchanger 64, respectively, and selects the maximum value of them to control the operation of the compressor 2.

8 Claims, 15 Drawing Sheets

(56) References Cited

U.S. PATENT DOCUMENTS

| | | | |
|---|---|---|---|
| 7,797,958 B2 | 9/2010 | Alston et al. | |
| 2004/0237549 A1* | 12/2004 | Okawara | B60H 1/3208 62/226 |
| 2005/0252222 A1* | 11/2005 | Jessen | F25B 5/02 62/175 |
| 2007/0144190 A1* | 6/2007 | Temmyo | F25B 1/10 62/186 |
| 2009/0249802 A1* | 10/2009 | Nemesh | F25B 5/02 62/214 |
| 2019/0111756 A1 | 4/2019 | Makimoto et al. | |

FOREIGN PATENT DOCUMENTS

| | | |
|---|---|---|
| JP | 2000-296715 A | 10/2000 |
| JP | 2003-220815 A | 8/2003 |
| JP | 2003-279180 A | 10/2003 |
| JP | 2012-171581 A | 9/2012 |
| JP | 2016-064704 A | 4/2016 |
| JP | 2018-177083 A | 11/2018 |
| JP | 2019-137208 A | 8/2019 |
| JP | 2020-001609 A | 1/2020 |
| WO | 2020/100410 A1 | 5/2020 |

OTHER PUBLICATIONS

International Search Report mailed Apr. 6, 2021 for International Application No. PCT/JP2021/006341.

Japan Patent Office, Notice of Reasons for Refusal issued in Japanese Patent Application No. 2020-062764, dated Aug. 15, 2023.

China National Intellectual Property Administration, First Examination Opinion Notice issued in Chinese Patent Application No. 202180020589.X, dated Oct. 18, 2024 (14 pages).

* cited by examiner

AIR CONDITIONER FOR VEHICLE

CROSS-REFERENCE TO RELATED APPLICATIONS

This application is a U.S. National Stage Patent Application under 37 U.S.C. § 371 of International Patent Application No. PCT/JP2021/006341, filed on Feb. 19, 2021, which claims the benefit of Japanese Patent Application No. JP 2020-062764, filed on Mar. 31, 2020, the disclosures of each of which are incorporated herein by reference in their entirety.

TECHNICAL FIELD

The present invention relates to an air conditioner which conditions air of a vehicle interior of a vehicle.

BACKGROUND ART

Due to actualization of environmental problems in recent years, vehicles such as electric vehicles and hybrid cars each of which drives a motor for running by power supplied from a battery mounted in the vehicle have spread. Further, as an air conditioner which is applicable to such a vehicle, there has been developed one which includes a refrigerant circuit to which a compressor, a radiator, a heat absorber (evaporator), and an outdoor heat exchanger are connected, and which conditions air of a vehicle interior by letting a refrigerant discharged from the compressor radiate heat in the radiator, letting the refrigerant from which the heat has been radiated in the radiator evaporate (absorb) heat in the outdoor heat exchanger to thereby perform heating, letting the refrigerant discharged from the compressor radiate heat in the outdoor heat exchanger, and letting the refrigerant evaporate (absorb) heat in the heat absorber to thereby perform cooling, etc. (refer to, for example, Patent Document 1).

On the other hand, for example, when the battery is used under an environment where the temperature becomes high due to self-heating or the like due to its charging and discharging, its performance is reduced, and its deterioration will progress, and eventually there is a risk that the battery malfunctions to break. Therefore, there has also been developed one in which a heat exchanger (evaporator) for a temperature-controlled object for cooling a battery is provided to circulate a refrigerant circulating in a refrigerant circuit in the heat exchanger for the temperature-controlled object and exchange heat with a heat medium, and to circulate the heat-exchanged heat medium in the battery, thereby to make it possible to cool the battery (refer to, for example, Patent Document 2).

CITATION LIST

Patent Documents

Patent Document 1: Japanese Patent Application Publication No. 2016-64704
Patent Document 2: Japanese Patent Application Publication No. 2020-1609

SUMMARY OF THE INVENTION

Problems to be Solved by the Invention

In the air conditioner for the vehicle having a plurality of the evaporators as in Patent Document 2, a valve device is provided in front of each evaporator, and in an operation mode in which the number of revolutions of a compressor is controlled based on the temperature of a heat absorber, for example, the battery is cooled by opening and closing the valve device in front of the heat exchanger for the temperature-controlled object. Further, in an operation mode in which the number of revolutions of the compressor is controlled by the temperature of the heat medium cooled by the heat exchanger for the temperature-controlled object, air conditioning is performed by opening and closing the valve device in front of the heat absorber.

Therefore, for example, in the former operation mode, when the temperature of the heat absorber reaches a target temperature even though the temperature of the heat medium is high (the load on the heat exchanger for the temperature-controlled object is large), the number of revolutions of the compressor is reduced. Therefore, the cooling capacity of the battery runs short, and the target temperature cannot be achieved. Further, in the latter operation mode, when the temperature of the heat medium reaches the target temperature even though the temperature of the heat absorber is high (the load on the heat absorber is large), the number of revolutions of the compressor decreases in like manner. A problem therefore arises in that the air conditioning capacity (cooling capacity) runs short, and the target temperature cannot be achieved.

The present invention has been made to solve such conventional technical problems, and an object thereof is to provide an air conditioner for a vehicle which is capable of realising appropriate temperature control when having a plurality of evaporators even when the load in each evaporator fluctuates.

Means for Solving the Problems

An air conditioner for a vehicle of the present invention includes at least a compressor to compress a refrigerant, a plurality of evaporators to evaporate the refrigerant, and a control device, and conditions air of a vehicle interior. The air conditioner for the vehicle is characterized in that the control device calculates each of target numbers of revolutions of the compressor required to control the temperature of each of the evaporators or an object to be cooled by the evaporator, and selects the maximum value among a plurality of the target numbers of revolutions calculated corresponding to the respective evaporators to control the operation of the compressor.

The air conditioner for the vehicle of the invention of claim 2 is characterized in the above invention by including a plurality of valve devices to control the flow of the refrigerant into each of the evaporators and in that the control device controls the valve device on the basis of the temperature of each evaporator or the object to be cooled by the evaporator, or the presence or absence of a cooling request by each evaporator.

The air conditioner for the vehicle of the invention of claim 3 is characterized in that in the above invention, the valve device is an opening/closing valve or a fully closable flow rate control valve, and when the valve device is open, the control device calculates the target number of revolutions corresponding to the evaporator whose flow of the refrigerant is controlled by the valve device.

The air conditioner for the vehicle of the invention of claim 4 is characterized in that in the above invention, when the valve device is closed, the control device maintains the target number of revolutions corresponding to the evaporator whose flow of the refrigerant is controlled by the valve device at 0, or a control lower limit value, or the current value.

The air conditioner for the vehicle of the invention of claim 5 is characterized in that in the above respective inventions, in calculating the target number of revolutions, the control device performs feedback calculation based on the temperature of each of the evaporators or the object to be cooled by the evaporator and the control device includes integral calculation in the feedback calculation, and in calculating a target number of revolutions which is not the maximum value, the control device stops the integral calculation.

The air conditioner for the vehicle of the invention of claim 6 is characterized in that in the above respective inventions, in calculating the target number of revolutions, the control device performs feedforward calculation based on the target temperature of each of the evaporators or the object to be cooled by the evaporator, and at the start of operation, the control device selects the maximum value among the target numbers of revolutions of the compressor corresponding to each of the evaporators calculated by the feedforward calculation to control the operation of the compressor.

The air conditioner for the vehicle of the invention of claim 7 is characterized in that in the above respective inventions, the plurality of evaporators are any two or all of a front seat heat absorber to evaporate the refrigerant to cool the air supplied to a front part of the vehicle interior, a rear seat heat absorber to evaporate the refrigerant to cool the air supplied to a rear part of the vehicle interior, and a heat exchanger for a temperature-controlled object to evaporate the refrigerant to cool the temperature-controlled object mounted on the vehicle.

The air conditioner for the vehicle of the invention of claim 8 is characterized in that in the invention of claim 3 or 4, the plurality of evaporators include a heat exchanger for a temperature-controlled object to evaporate the refrigerant to cool the temperature-controlled object mounted on the vehicle, and when the temperature of the temperature-controlled object becomes equal to or higher than a predetermined upper limit value or becomes higher than the upper limit value, the control device fixes the valve device for controlling the flow of the refrigerant to the heat exchanger for the temperature-controlled object to an open state, and fixes the other valve devices to a closed state.

The air conditioner for the vehicle of an embodiment is characterized in that in the invention of claim 7 or 8, the temperature-controlled object is a battery.

Advantageous Effect of the Invention

According to the present invention, in an air conditioner for a vehicle, which includes at least a compressor to compress a refrigerant, a plurality of evaporators to evaporate the refrigerant, and a control device, and conditions air of a vehicle interior, the control device calculates each of target numbers of revolutions of the compressor required to control the temperature of each of the evaporators or an object to be cooled by the evaporator, and selects the maximum value among a plurality of the target numbers of revolutions calculated corresponding to the respective evaporators to control the operation of the compressor. Therefore, in the air conditioner for the vehicle having the plurality of evaporators, even if the load in each evaporator fluctuates, the inconvenience that the shortage of the cooling capacity occurs in all the evaporators can be eliminated, and appropriate temperature control by each evaporator can be realized.

Thus, for example, as in an embodiment, when the plurality of evaporators are any two or all of a front seat heat absorber to evaporate the refrigerant to cool the air supplied to a front part of the vehicle interior, a rear seat heat absorber to evaporate the refrigerant to cool the air supplied to a rear part of the vehicle interior, and a heat exchanger for a temperature-controlled object to evaporate the refrigerant to cool the temperature-controlled object mounted on the vehicle, it is possible to, even when the load in each heat absorber or the heat exchanger for the temperature-controlled object fluctuates, eliminate the inconvenience that the air conditioning capacity and the cooling capacity of the temperature-controlled object are generated, and realize appropriate air conditioning control and cooling control for the temperature-controlled object. This is extremely effective when the object to be temperature-controlled is a battery.

Further, as in the invention of claim 2, if a plurality of valve devices to control the flow of the refrigerant into each of the evaporators are provided, and the control device controls the valve device on the basis of the temperature of each evaporator or the object to be cooled by the evaporator, or the presence or absence of a cooling request by each evaporator, it is possible to appropriately perform cooling control by each evaporator even in the air conditioner for the vehicle having the plurality of evaporators.

In this case, as in the invention of claim 3, if the valve device is constituted of an opening/closing valve or a fully closable flow rate control valve, and when the valve device is open, the control device calculates the target number of revolutions corresponding to the evaporator whose flow of the refrigerant is controlled by the valve device, it is possible to prevent the calculation of the target number of revolutions from being performed for the evaporator in which the valve device is closed, that is, the evaporator which does not need to generate cooling action, and to eliminate unnecessary arithmetic processing by the control device.

Further, as in the invention of claim 4, if the control device maintains the target number of revolutions corresponding to the evaporator whose flow of the refrigerant is controlled by the valve device at 0, or a control lower limit value, or the current value when the valve device is closed, it is possible to reliably avoid the inconvenience that the target number of revolutions corresponding to the evaporator which does not need to generate the cooling action is selected.

Here, in calculating the target number of revolutions, when the control device performs feedback calculation based on the temperature of each evaporator or the object to be cooled by the evaporator, and the feedback calculation includes integral calculation, there is a risk that when the integral calculation of the unselected target number of revolutions is continued, the controllability deteriorates when the target number of revolutions is subsequently selected.

Therefore, as in the Invention of claim 5, if the control device stops the integral calculation in the calculation of the target number of revolutions being not the maximum value, the deterioration of such controllability can be avoided in advance.

Further, in calculating the target number of revolutions, when the control device performs feedforward calculation based on the target temperature of each of the evaporators or the object to be cooled by the evaporator, the control device selects the maximum value among the target numbers of revolutions of the compressor corresponding to each evaporator calculated by the feedforward calculation at the start of operation as in the invention of claim 6 to control the operation of the compressor. Consequently, it is possible to eliminate the inconvenience that the shortage of the cooling capacity occurs in all the evaporators from the start of operation and realize appropriate temperature control by each evaporator.

In addition, as in an embodiment, when the plurality of evaporators include a heat exchanger for a temperature-controlled object to evaporate the refrigerant to cool the temperature-controlled object mounted on the vehicle, the control device fixes the valve device for controlling the flow of the refrigerant to the heat exchanger for the temperature-controlled object to an open state, and fixes the other valve devices to a closed state where the temperature of the temperature-controlled object becomes equal to or higher than a predetermined upper limit value or becomes higher than the upper limit value. Consequently, when the temperature of the temperature-controlled object becomes equal to or higher than the predetermined upper limit value or becomes higher than the upper limit value, the refrigerant is constantly circulated through the heat exchanger for the temperature-controlled object and prevented from flowing to other evaporators, thereby making it possible to rapidly lower the temperature of the temperature-controlled object. Thus, when the temperature-controlled object is a battery as in and embodiment, it is possible to avoid in advance the inconvenience that the temperature rises excessively, prevent deterioration, and extend the life of the battery.

MODE FOR CARRYING OUT THE INVENTION

Hereinafter, embodiments of the present Invention will be described in detail with reference to the drawings.

Embodiment 1

Figure 1:
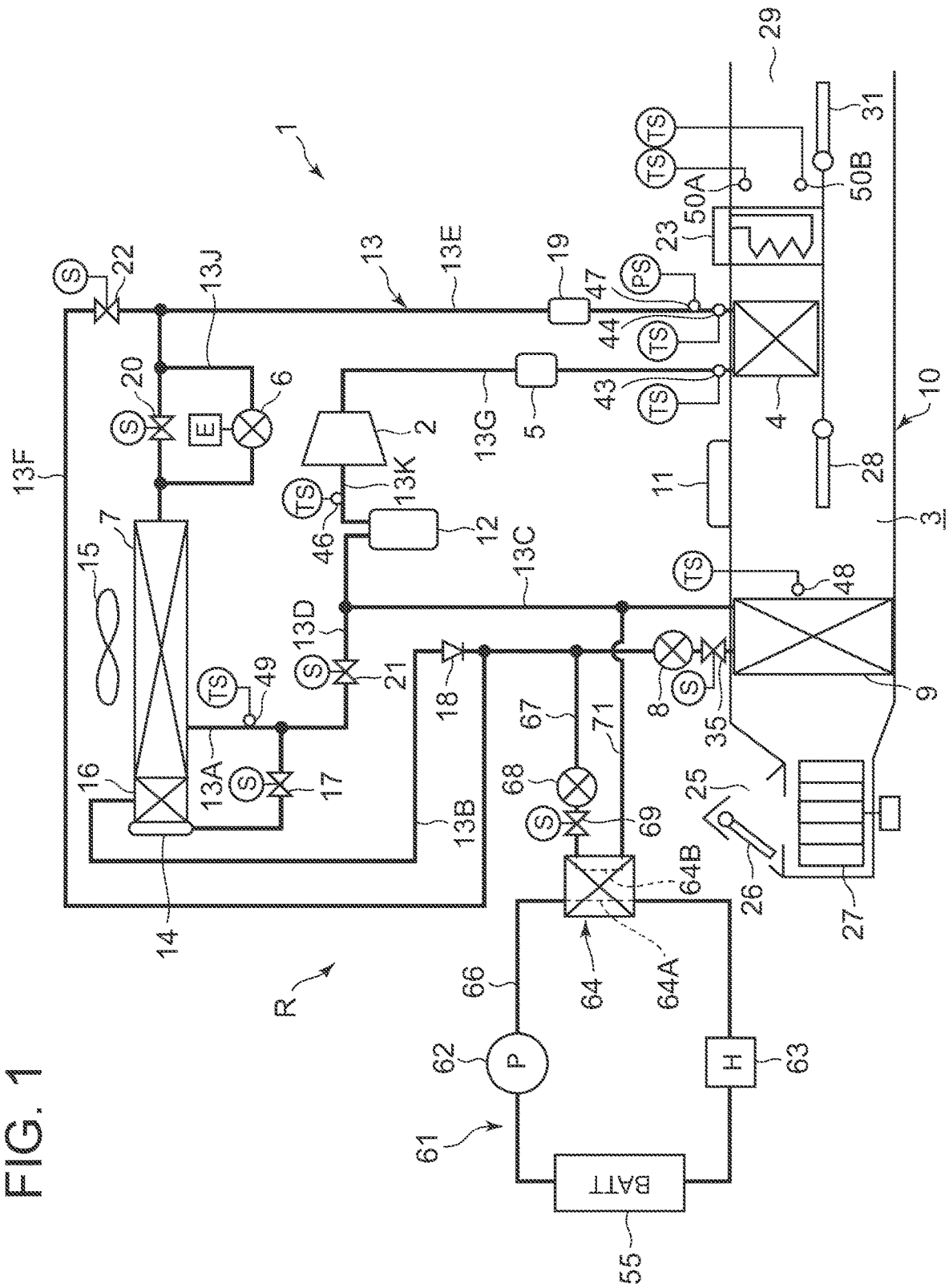
FIG. 1 is a constitutional diagram of an air conditioner for a vehicle of an embodiment to which the present invention is applied (Embodiment 1)

FIG. 1 illustrates a constitutional diagram of an air conditioner 1 for a vehicle of an embodiment of the present invention. A vehicle of the embodiment to which the present invention is applied is an electric vehicle (EV) in which an engine (an internal combustion engine) is not mounted, and is driven and runs with an electric motor for running (an electric motor and not illustrated in the drawing) by being supplied thereto with power charged in a battery 55 mounted on the vehicle. A compressor 2 and other devices of the air conditioner 1 for the vehicle of the present invention are also driven by the power supplied from the battery 55.

That is, in the electric vehicle which is not capable of performing heating by engine waste heat, the air conditioner 1 for the vehicle of the embodiment changes and executes by a heat pump operation using a refrigerant circuit R, respective air-conditioning operations of a heating mode, a dehumidifying and heating mode, a dehumidifying and cooling mode, and a cooling mode, and respective battery cooling operations of a defrosting mode, a cooperative mode, and a battery cooling single mode to perform air conditioning of a vehicle interior and temperature control of the battery 55.

Incidentally, as the vehicles, the present invention is effective not only for electric vehicles but also for so-called hybrid cars which use an engine and a motor for running in common. Further, the vehicle to which the air conditioner 1 for the vehicle of the embodiment is applied is such that the battery 55 can be charged from an external charger (quick charger or ordinary charger). In addition, the battery 55, the motor for running, the inverter for controlling the same, and the like described above are subject to temperature control mounted on the vehicle the present invention. However, in the following embodiments, the battery 55 will be described by being taken as an example.

The air conditioner 1 for the vehicle of the embodiment performs air conditioning (heating, cooling, dehumidifying, and ventilation) of the vehicle interior of the electric vehicle. An electric type of compressor 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a muffler 5 and a refrigerant pipe 13G and to let the refrigerant radiate heat to the vehicle interior (discharge heat of the refrigerant), an outdoor expansion valve 6 constituted of an electric valve (an electronic expansion valve, a flow rate control valve) to decompress and expand the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat during the heating (to cause the refrigerant to absorb heat), an indoor expansion valve 8 constituted of a mechanical expansion valve to decompress and expand the refrigerant, a heat absorber 9 as a heat absorber for a front seat being an embodiment of an evaporator, which is provided in the air flow passage 3 to let the refrigerant absorb heat (evaporate) during the cooling and dehumidifying from interior and exterior of the vehicle, an accumulator 12, and others are successively connected by a refrigerant pipe 13, whereby a refrigerant circuit R is constituted.

Then, the outdoor expansion valve 6 decompresses and expands the refrigerant flowing out from the radiator 4 and flowing in the outdoor heat exchanger 7 and can also be fully closed. Further, in the embodiment, the indoor expansion valve 8 in which the mechanical expansion valve is used decompresses and expands the refrigerant flowing in the heat absorber 9 and adjusts a superheat degree of the refrigerant in the heat absorber 9.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A on a refrigerant outlet side of the outdoor heat exchanger 7 is connected to the receiver drier portion 14 via a solenoid valve 17 (for cooling) as an opening/closing valve to be opened when allowing the refrigerant to flow through the heat absorber 9. A refrigerant pipe 13B on an outlet side of the subcooling portion 16 is connected to a refrigerant inlet side of the heat absorber 9 via a check valve 18, the indoor expansion valve 8, and a solenoid valve 35 (indicated by a cabin valve in a flowchart and a control block diagram to be described later. The same applies hereinafter) being an opening/closing valve as a valve device for the heat absorber 9 successively. The solenoid valve 35 is a valve device for controlling the flow of the refrigerant to the heat absorber 9.

Incidentally, the receiver drier portion 14 and the supercooling portion 16 structurally form a part of the outdoor heat exchanger. Also, the check valve 18 has the direction of the indoor expansion valve 8 which serves as a forward direction. Further, in the embodiment, the indoor expansion valve 8 and the solenoid valve 35 are configured by a solenoid valve-equipped expansion valve.

Also, the refrigerant pipe 13A extending out from the outdoor heat exchanger 7 branches into a refrigerant pipe 13D, and this branching refrigerant pipe 13D communicates and connects with a refrigerant pipe 13C located on a refrigerant outlet side of the heat absorber 9 via a solenoid valve 21 (for heating) as an opening/closing valve to be opened during the heating. Then, the refrigerant pipe 13C is connected to an inlet side of the accumulator 12, and an outlet side of the accumulator 12 is connected to a refrigerant pipe 13K on a refrigerant suction side of the compressor 2.

Further, a strainer 19 is connected to a refrigerant pipe 13E on a refrigerant outlet side of the radiator 4. Furthermore, the refrigerant pipe 13E branches to a refrigerant pipe 13J and a refrigerant pipe 13F before the outdoor expansion valve 6 (on a refrigerant upstream side). One branching refrigerant pipe 13J is connected to a refrigerant inlet side of the outdoor heat exchanger 7 via the outdoor expansion valve 6. Additionally, the other branching refrigerant pipe 13F communicates and connects with the refrigerant pipe 13B located on a refrigerant downstream side of the check valve 18 and on a refrigerant upstream side of the indoor expansion valve 8 via a solenoid valve 22 (for dehumidifying) as an opening/closing valve to be opened during the dehumidifying.

Consequently, the refrigerant pipe 13F is connected in parallel with a series circuit of the outdoor expansion valve 6, the outdoor heat exchanger 7, and the check valve 18. The refrigerant pipe 13F becomes a bypass circuit which bypasses the outdoor expansion valve 6, the outdoor heat exchanger 7, and the check valve 18. Further, a solenoid valve 20 as an opening/closing valve for bypass is connected in parallel with the outdoor expansion valve 6.

Also, in the air flow passage 3 on an air upstream side of the heat absorber 9, respective suction ports such as an outdoor air suction port and an indoor air suction port are formed (represented by a suction port 25 in FIG. 1). In the suction port 25, an air inlet changing damper 26 is disposed to change the air to be introduced into the air flow passage 3 to indoor air which is air of the vehicle interior (indoor air circulation) and outdoor air which is air outside the vehicle interior (outdoor air introduction). Further, an indoor blower (a blower fan) 27 to supply the introduced indoor or outdoor air to the air flow passage 3 is disposed on an air downstream side of the air inlet changing damper 26.

Incidentally, the air inlet changing damper 26 of the embodiment is constituted in such a manner that a ratio between the outdoor air and indoor air flowing into the heat absorber 9 in the air flow passage 3 can be adjusted between 0 and 100% by opening and closing the outdoor air suction port and the indoor air suction port of the suction port 25 at an arbitrary ratio. In the present application, the ratio between the outdoor air and the indoor air which is adjusted by the air inlet changing damper 26 is referred to as an indoor/outdoor air ratio RECrate. When the indoor/outdoor air ratio RECrate=1, an indoor air circulating mode in which the indoor air is 100% and the outdoor air is 0% is taken. When the indoor/outdoor air ratio RECrate=0, an outdoor air introducing mode in which the outdoor air is 100% and the indoor air is 0% is taken. Then, when 0<indoor/outdoor air ratio RECrate<1, an indoor/outdoor air intermediate position at which 0%<indoor air<100% and 100%>outdoor air>0% is taken. That is, in the present application, the indoor/outdoor air ratio RECrate means the rate of the indoor air of the air flowing into the heat absorber 9 in the air flow passage 3.

Further, in the air flow passage 3 on the leeward side (downstream side of the air) of the radiator 4, an auxiliary heater 23 as an auxiliary heating device composed of a PTC heater (electric heater) is provided in the embodiment and makes it possible to heat the air supplied the vehicle interior through the radiator 4. Additionally, in the air flow passage 3 on the air upstream side of the radiator 4, there is provided an air mix damper 28 to adjust a ratio at which the air (the indoor or outdoor air) in the air flow passage 3 flowing into the air flow passage 3 and passed through the heat absorber 9 is to be passed through the radiator 4 and the auxiliary heater 23.

Furthermore, in the air flow passage 3 on the air downstream side of the radiator 4, there is formed each air outlet (shown as a representative by an air outlet 29 in FIG. 1) of FOOT (foot), VENT (vent) and DEF (defroster). In the air outlet 29, there is provided an air outlet changing damper 31 to execute changing control of blowing of the air from each air outlet described above.

Additionally, the air conditioner 1 for the vehicle is provided with an equipment temperature adjusting device 61 for circulating the heat medium in the battery 55 (to be temperature-controlled) to adjust the temperature of the battery 55. The equipment temperature adjusting device 61 of the embodiment is provided with a circulating pump 62 as a circulating device for circulating the heat medium in the battery 55, a refrigerant-heat medium heat exchanger 64 as a heat exchanger for a temperature-controlled object which is an evaporator, and a heat medium heating heater 63 as a heating device. Those and the battery 55 are annularly connected by a heat medium pipe 66.

In the case of the embodiment, an inlet of a heat medium flow passage 64A of the refrigerant-heat medium heat exchanger 64 is connected to a discharge side of the circulating pump 62, and an outlet of the heat medium flow passage 64A is connected to an inlet of the heat medium heating heater 63. An outlet of the heat medium heating heater 63 is connected to an inlet of the battery 55, and an outlet of the battery 55 is connected to a suction side of the circulating pump 62.

As the heat medium used in the equipment temperature adjusting device 61, for example, water, a refrigerant like HFO-1234yf, liquid such as a coolant or the like, or gas such as air or the like can be employed. Incidentally, in the embodiment, water is employed as the heat medium. Also, the heat medium heating heater 63 is constituted of an electric heater such as a PTC heater or the like. Further, for example, a jacket structure capable of circulating the heat medium in a heat exchange relation with the battery 55 is provided around the battery 55.

Then, when the circulating pump 62 is operated, the heat medium discharged from the circulating pump 62 flows into the heat medium flow passage 64A of the refrigerant-heat medium heat exchanger 64. When the heat medium flowing out from the heat medium flow passage 64A of the refrigerant-heat medium heat exchanger 64 reaches the heat medium heating heater 63, and the heat medium heating heater 63 generates heat, the heat medium is heated thereat and then reaches the battery 55, where the heat medium exchanges heat with the battery 55. Then, the heat medium which has exchanged heat with the battery 55 is sucked into the circulating pump 62 and circulated in the heat medium pipe 66 (indicates by a broken line arrow in FIG. 4 and others).

On the other hand, one end of a branch pipe 67 as a branch circuit is connected to the refrigerant pipe 13B located on the refrigerant downstream sire of a connecting part between the refrigerant pipe 13F and the refrigerant pipe 13E in the refrigerant circuit R and located on the refrigerant upstream side of the indoor expansion valve 8. In the embodiment, there are provided sequentially in the branch pipe 67, an auxiliary expansion valve 68 composed of a mechanical expansion valve, and a solenoid valve 69 which is an opening/closing valve as a valve device (shown as a chiller valve in a flowchart and a control block diagram described later. The same applies hereinafter). The solenoid valve 69 is a valve device for controlling the flow of the refrigerant to the refrigerant-heat medium heat exchanger 64. The auxiliary expansion valve 68 decompresses and expands the refrigerant flowing into a refrigerant flow passage 643 described later in the refrigerant-heat medium heat exchanger 64, and adjusts the superheat degree of the refrigerant in the refrigerant flow passage 643 of the refrigerant-heat medium heat exchanger 64. Incidentally, in the embodiment, the auxiliary expansion valve 68 and the solenoid valve 69 are also configured by a solenoid valve-equipped expansion valve.

The other end of the branch pipe 67 is connected to the refrigerant flow passage 643 of the refrigerant-heat medium heat exchanger 64. One end of a refrigerant pipe 71 is connected to an outlet at the refrigerant flow passage 643, and the other end of the refrigerant pipe 71 is connected to the refrigerant pipe 130 on the upstream side of the refrigerant (refrigerant upstream side of the accumulator 12) from a joining point with the refrigerant pipe 130. Then, these auxiliary expansion valve 68, solenoid valve 69, and refrigerant flow passage 64B of the refrigerant-heat medium heat exchanger 64, and the like also form a part of the refrigerant circuit R, and at the same time, form even a part of the equipment temperature adjusting device 61.

When the solenoid valve 69 is opened, the refrigerant (some or all the refrigerant) discharged from the outdoor heat exchanger 7 flows into the branch pipe 67 and is decompressed by the auxiliary expansion valve 68. Then, the refrigerant passes through the solenoid valve 69 and flows into the refrigerant flow passage 64B of the refrigerant-heat medium heat exchanger 64 to evaporate there. The refrigerant absorbs heat from the heat medium flowing through the heat medium flow passage 641A in the process of flowing through the refrigerant flow passage 64E, and then is sucked into the compressor 2 from the refrigerant pipe 13K via the refrigerant pipe 71, the refrigerant pipe 13C, and the accumulator 12.

Figure 2:
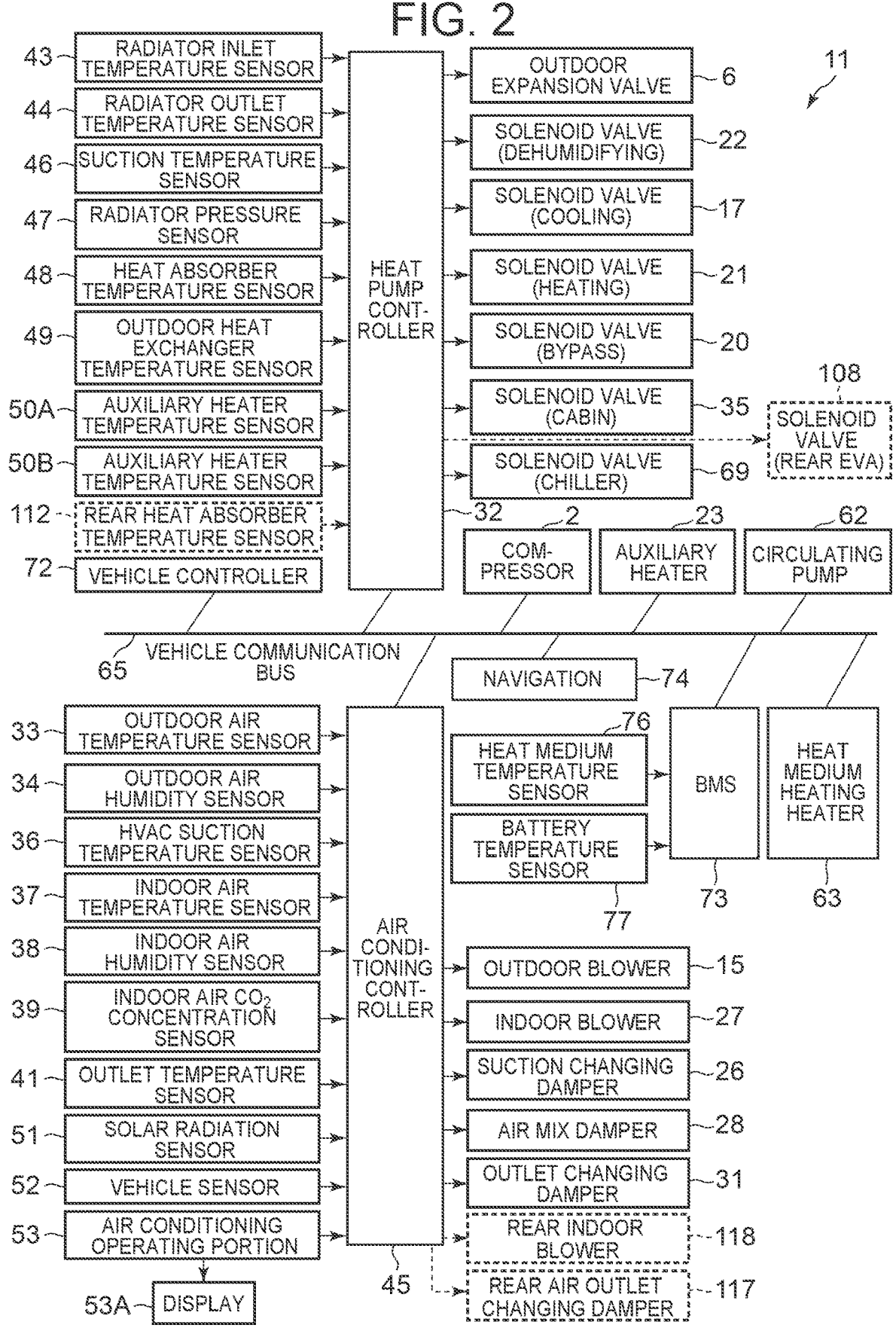
FIG. 2 is a block diagram of an electric circuit of a control device of the air conditioner for the vehicle of FIG. 1.
Figure 3:
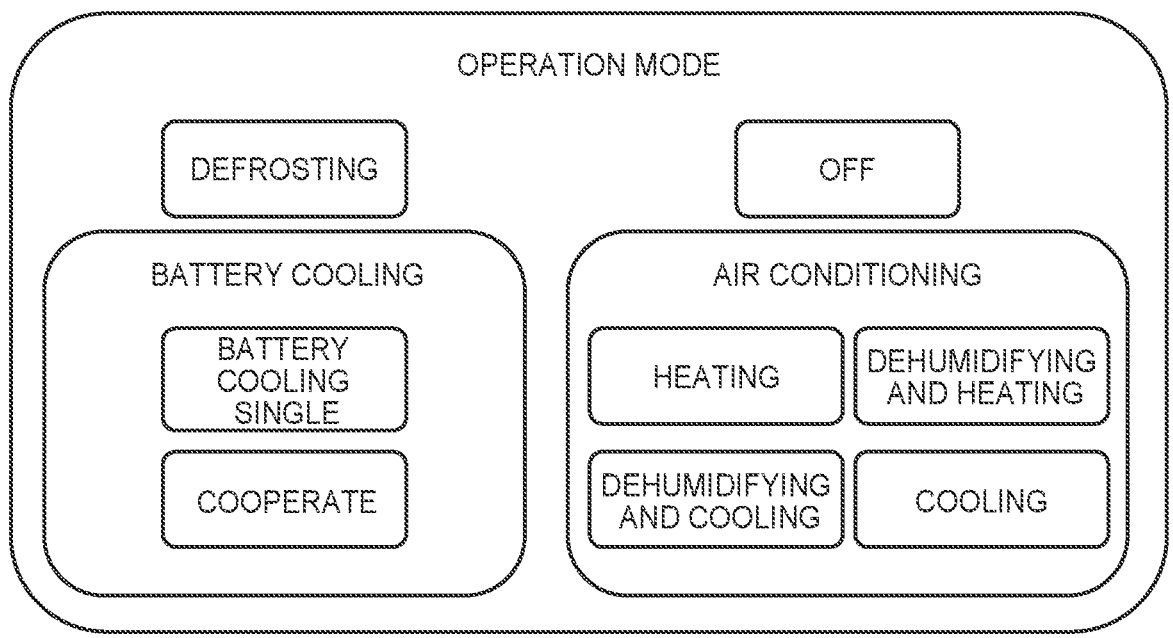
FIG. 3 is a diagram to explain an operation mode executed by the control device of FIG. 2.

Next, FIG. 2 shows a block diagram of a control device 11 of the air conditioner 1 for the vehicle of the embodiment. The control device 11 is constituted of an air conditioning controller 45 and a heat pump controller 32 both constituted of a microcomputer as an example of a computer having a processor. These are connected to a vehicle communication bus 65 which constitutes a CAN (Controller Area Network) or a LIN (Local Interconnect Network). Further, the compressor 2, the auxiliary heater 23, the circulating pump 62, and the heat medium heating heater 63 are also connected to the vehicle communication bus 65. These air conditioning controller 45, heat pump controller 32, compressor 2, auxiliary heater 23, circulating pump 62, and heat medium heating heater 63 are constituted to perform transmission and reception of data through the vehicle communication bus 65.

Further, a vehicle controller 72 (ECU) which controls the entire vehicle including running, a battery contrail (BMS: Battery Management system) 73 which controls charging and discharging of the battery 55, and a GPS navigation device 74 are connected to the vehicle communication bus 65. The vehicle controller 72, the batter, controller 73, and the GPS navigation device 74 are also constituted of a microcomputer which is an example of a computer equipped with a processor. The air conditioning controller 45 and the heat pump controller 32 constituting the control device 11 are constituted to perform transmission and reception of information (data) to and from the vehicle controller the battery controller 73, and the GPS navigation device 74 via the vehicle communication bus 65.

The air conditioning controller 45 is a high-order controller which performs control of vehicle interior air conditioning of the vehicle. An input of the air conditioning controller 45 is connected with respective outputs of an outdoor air temperature sensor 33 which detects an outdoor air temperature (Tam) of the vehicle, an outdoor air humidity sensor 34 which detects an outdoor air humidity, a HVAC suction temperature sensor 36 which detects a temperature of the air to be sucked from the suction port 25 to the air flow passage 3 and flow into the heat absorber 9, an indoor air temperature sensor 37 which detects a temperature (an indoor air temperature Tin) of the air of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a solar radiation sensor 51 of, e.g., a photo sensor system to detect a solar radiation amount into the vehicle interior, and a velocity sensor 52 to detect a moving velocity (a velocity VSP) of the vehicle, and an air conditioning operating unit 53 to perform air-conditioning setting operations in the vehicle interior such as changing of a predetermined temperature and an operation mode in the vehicle interior, and the display of information. Incidentally, 53A in the figure is a display as a display output device provided in the air conditioning operating unit 53.

Further, an output of the air conditioning controller 45 is connected with the outdoor blower 15, the indoor blower (blower fan) 27, the air inlet changing damper 26, the air mix damper 28, and the air outlet changing damper 31. They are controlled by the air conditioning controller 45.

The heat pump controller 32 is a controller which mainly performs control of the refrigerant circuit R. An input of the heat pump controller 32 is connected with respective outputs of a radiator inlet temperature sensor 43 which detects a refrigerant inlet temperature Tcxin (which is also a discharge refrigerant temperature of the compressor 2) of the radiator 4, a radiator outlet temperature sensor 44 which detects a refrigerant outlet temperature Tci of the radiator 4, a suction temperature sensor 46 which detects a suction refrigerant temperature Ts of the compressor 2, a radiator pressure sensor 47 which detects a refrigerant pressure (pressure of the radiator 4: a radiator pressure Pci) on the refrigerant outlet side of the radiator 4, a heat absorber temperature sensor 48 which detects a temperature (a refrigerant temperature of the heat absorber 9: a heat absorber temperature Te) of the heat absorber 9, an outdoor heat exchanger temperature sensor 49 which detects a refrigerant temperature (a refrigerant evaporation temperature of the outdoor heat exchanger 7: an outdoor heat exchanger temperature TXO) of an outlet of the outdoor heat exchanger 7, and auxiliary heater temperature sensors 50A (driver's seat side) and 50B (front passenger's seat side) which detect a temperature of the auxiliary heater 23.

Further, an output of the heat pump controller 32 is connected with respective solenoid valves of the outdoor expansion valve 6, the solenoid valve 22 (for the dehumidifying), the solenoid valve 17 (for the cooling), the solenoid valve 21 (for the heating), the solenoid valve 20 (for the bypass), the solenoid valve 35 (cabin valve), and the solenoid valve 69 (chiller valve). They are controlled by the heat pump controller 32. Incidentally, the compressor 2, the auxiliary heater 23, the circulating pump 62, and the heat medium heating heater 63 respectively have controllers incorporated therein. In the embodiment, the controllers of the compressor 2, the auxiliary heater 23, the circulating pump 62, and the heat medium heating heater 63 perform transmission and reception of data to and from the heat pump controller 32 via the vehicle communication bus 65 and are controlled by the heat pump controller 32 (parts shown by broken lines in FIG. 2 will be described in detail in an embodiment 2).

Incidentally, the circulating pump 62 and the heat medium heating heater 63 constituting the equipment temperature adjusting device 61 may be controlled by the battery controller 73. Further, the battery controller 73 is connected with outputs of a heat medium temperature seas which detects a temperature (a heat medium temperature Tw) of the heat medium on the inlet side of the heat medium flow path 64A of the refrigerant-heat medium heat exchanger 64 of the equipment temperature adjusting device 61, and a battery temperature sensor 77 which detects a temperature (a temperature of the battery 55 itself: a battery temperature Tcell) of the battery 55. Then, in the embodiment, the remaining amount of the battery 55 (the amount of electricity stored), information on the charging of the battery 55 (information that the battery is being charged, a charging completion time, a remaining charging time, etc.), the heat medium temperature Tw, the battery temperature Tcell, and the amount of heat generated by the battery 55 (calculated by the battery controller 73 from the amount of energization and the like) and the like are transmitted from the battery controller 73 to the air conditioning controller 45 and the vehicle controller 72 via the vehicle communication bus 65. The information regarding the charging completion time and the remaining charging time at the time of charging the battery 55 is information supplied from an external charger such as a quick charger. Further, the output MPower of the motor for running is transmitted from the vehicle controller 72 to the heat puma controller 32 and the air conditioning controller 45.

The heat pump controller 32 and the air conditioning controller 45 mutually perform transmission and reception of the data via the vehicle communication bus 65 and control respective devices on the basis of the outputs of the respective sensors and the setting input by the air conditioning operating unit 53. However, in the embodiment in this case, an air volume Ga (calculated by the air conditioning controller 45) of the air flowing into the outdoor air temperature sensor 33, the outdoor air humidity sensor 34, the HVAC suction temperature sensor 36, the indoor air temperature sensor 37, the indoor air humidity sensor 38, the indoor air $CO_2$ concentration sensor 39, the outlet temperature sensor 41, the solar radiation sensor 51, the velocity sensor 52, and the air flow passage 3 and circulating in the air flow passage 3, an air volume ratio SW (calculated by the air conditioning controller 45) by the air mix damper 28, the voltage (BLV) of the indoor blower 27, the information from the battery controller 73 described above, the information from the GPS navigation device 74, and the output of the air conditioning operating unit 53 are adapted to be transmitted from the air conditioning controller 45 to the heat pump controller 32 through the vehicle communication bus 65 and to be used for control by the heat pump controller 32.

Further, the heat pump controller 32 also transmits data (information) regarding the control of the refrigerant circuit R to the air conditioning controller 45 via the vehicle communication bus 65. Incidentally, the air volume ratio SW by the air mlx damper 28 described above is calculated by the air conditioning controller 45 in the range of 0≤SW≤1. Then, when SW=1, all of the air which has passed through the heat absorber 9 is vent dated to the radiator 4 and the auxiliary heater 23 by the air mix damper 28.

Next, the operation of the air conditioner 1 for the vehicle of the embodiment will be described with the above constitution. In the embodiment, the control device 11 (the air conditioning controller 45 and the heat pump controller 32) changes and executes the respective air-conditioning operations of the heating mode, the dehumidifying and heating mode, the dehumidifying and cooling mode, and the cooling mode, the respective battery cooling operations of the cooperative more and the battery cooling single mode, and the defrosting mode. These are shown in FIG. Incidentally, the heat pump controller 32 operates the circulating pump 62 during operation, and circulates the heat medium in the heat medium pipe 66 as indicated by broken line arrows in FIGS. 4 to 6.

(1) Air-Conditioning Operation

Frist, description will be made about the air-conditioning operation to air-condition the vehicle interior.

(1-1) Heating Mode

First, the heating mode will be described. Incidentally, the control of each device is executed by the cooperation of the heat pump controller 32 and the air conditioning controller 45, but in the following description, the heat pump controller 32 is taken as a control main body and will be simplified and described. When the heating mode is selected by the heat pump controller 32 (an auto mode) or by a manual air conditioning setting operation (a manual mode) to the air conditioning operating unit 53 of the air conditioning controller 45, the heat pump controller 32 opens the solenoid valve 21 and closes the solenoid valve 17, the solenoid valve 20, the solenoid valve 22, the solenoid valve 35, and the solenoid valve 69. Then, the compressor 2 and the respective blowers 15 and 27 are operated. The air mix damper 28 has a state of adjusting the ratio at which the air blown from the indoor blower 27 is to be passed through the radiator 4 and the auxiliary heater 23.

Thus, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 flows through the refrigerant pipe 13A and the refrigerant pipe 13D, and the solenoid valve 21 to reach the refrigerant pipe 13C, and further flows through the refrigerant pipe 13C into the accumulator 12 to perform gas-liquid separation thereat, and thereafter the gas refrigerant is sucked into the compressor 2 through the refrigerant pipe 13K, thereby repeating this circulation. The air heated by the radiator 4 is blown out from the air outlet 29, and hence the heating of the vehicle interior is performed.

The heat pump controller 32 calculates a target radiator pressure PCO from a target heater temperature TCO (a target temperature of the radiator 4) calculated from a target outlet temperature TAO to be described later being a target temperature (a target value of the temperature of the air blown out to the vehicle interior) of the air blown out to the vehicle interior, controls the number of revolutions of the compressor 2 on the basis of the target radiator pressure PCO and the radiator pressure Pci (a high pressure of the refrigerant circuit R) detected by the radiator pressure sensor 47, and controls a valve position of the outdoor expansion valve 6 on the basis of the refrigerant outlet temperature Tci of the radiator 4 which is detected by the radiator outlet temperature sensor 44 and the radiator pressure Pci detected by the radiator pressure sensor 47, thereby controlling a subcool degree of the refrigerant in the outlet of the radiator 4.

When the heating capability (the capability for heating) by the radiator 4 runs shorter than a required heating capability, the heat pump controller 32 complements its lack by the generation of heat by the auxiliary heater 23. Consequently, the vehicle interior is heated without any trouble even at a low outdoor air temperature and the like.

(1-2) Dehumidifying and Heating Mode

Next, the dehumidifying and heating mode will be described. In the dehumidifying and heating mode, the heat pump controller 32 opens the solenoid valve 21, the solenoid valve 22, and the solenoid valve 35 and closes the solenoid valve 17, the solenoid valve 20, and the solenoid valve 69. Then, the compressor 2 and the respective blowers 15 and 27 are operated. The air mix damper 28 has a state of adjusting the ratio at which the air blown out from the indoor blower 27 is to be passed through the radiator 4 and the auxiliary heater 23.

Thus, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E. Some thereof flows into the refrigerant pipe 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). Then, the low-temperature refrigerant flowing out from the outdoor heat exchanger 7 flows through the refrigerant pipe 13A and the refrigerant pipe 13D, and the solenoid valve 21 to reach the refrigerant pipe 13C, and further flows through the refrigerant pipe 13C into the accumulator 12 to perform gas-liquid separation thereat, and thereafter the gas refrigerant is sucked into the compressor 2 through the refrigerant pipe 13K, thereby repeating this circulation.

On the other hand, the residual of the condensed refrigerant flowing to the refrigerant pipe 13E through the radiator 4 is distributed, and the distributed refrigerant flows into the refrigerant pipe 13F through the solenoid valve 22 to reach the refrigerant pipe 13B. Next, the refrigerant reaches the indoor expansion valve 8, where the refrigerant is decompressed and then flows into the heat absorber 9 through the solenoid valve 35 to evaporate. The water in the air blown out from the indoor blower 27 coagulates to adhere to the heat absorber 9 by a heat absorbing operation of the refrigerant which occurs in the heat absorber 9 at this time, and hence, the air is cooled and dehumidified.

The refrigerant evaporated in the heat absorber 9 flows out to the refrigerant pipe 13C to join the refrigerant (the refrigerant from the outdoor heat exchanger 7) from the refrigerant pipe 13D, and then flows through the accumulator 12 to be sucked into the compressor 2 from the refrigerant pipe 13K, thereby repeating this circulation. The air dehumidified in the heat absorber 9 is reheated in the process of passing the radiator 4 and the auxiliary heater 23

(when the heat is generated), thereby performing the dehumidifying and heating of the vehicle interior.

In the embodiment, the heat pump controller 32 controls the number of revolutions of the compressor 2 on the basis of the target radiator pressure PCO calculated from the target heater temperature TCO and the radiator pressure Pci detected by the radiator pressure sensor 47 (the high pressure of the refrigerant circuit R), or controls the number of revolutions of the compressor 2 on the basis of the temperature (the heat absorber temperature Te) of the heat absorber 9 which is detected by the heat absorber temperature sensor 48, and a target heat absorber temperature TEO being its target value. At this time, the heat pump controller 32 selects a lower compressor target number of revolutions obtainable by either of calculations from the radiator pressure Pci and the heat absorber temperature Te to control the compressor 2. Further, the heat pump controller 32 controls the valve position of the outdoor expansion valve 6 on the basis of the heat absorber temperature Te.

Further, when the heating capability (the capability for heating) by the radiator 4 runs shorter than a heating capability required even in the dehumidifying and heating mode, the heat pump controller 32 complements its lack by the generation of heat by the auxiliary heater 23. Consequently, the vehicle interior is dehumidified and heated without any trouble even at a low outdoor air temperature and the like.

(1-3) Dehumidifying and Cooling Mode

Next, the dehumidifying and cooling mode will be described. In the dehumidifying and cooling mode, the heat pump controller 32 opens the solenoid valve 17 and the solenoid valve 35, and closes the solenoid valve 20, the solenoid valve 21, the solenoid valve 22, and the solenoid valve 69. Then, the compressor 2 and the respective blowers 15 and 27 are operated. The air mix damper 28 has a state of adjusting the ratio at which the air blown out from the indoor blower 27 is to be passed through the radiator 4 and the auxiliary heater 23.

Thus, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant flowing out from the radiator 4 flows through the refrigerant pipes 13E and 13J to reach the outdoor expansion valve 6, and flows through the outdoor expansion valve 6 controlled to be slightly open (region of a large valve position) compared to the heating mode and the dehumidifying and heating mode, to flow into the outdoor heat exchanger 7. The refrigerant flowing into the outdoor heat exchanger 7 is cooled by the running therein or the outdoor air ventilated by the outdoor blower 15 to condense. The refrigerant flowing out from the outdoor heat exchanger 7 flows through the refrigerant pipe 13A, the solenoid valve 17, the receiver drier portion 14, and the subcooling portion 16 to enter the refrigerant pipe 13B and reach the indoor expansion valve 8 through the check valve 18. The refrigerant is decompressed in the indoor expansion valve 8 and then flows into the heat absorber 9 through the solenoid valve 35 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the refrigerant pipe 13C to reach the accumulator 12, and flows through the accumulator 12 to be sucked into the compressor 2 from the refrigerant pipe 13K, thereby repeating this circulation. The air cooled and dehumidified in the heat absorber 9 is reheated in the process of passing the radiator 4 and the auxiliary heater 23 (when heat is generated) (the heating capability is lower than that during dehumidifying and heating), thereby performing the dehumidifying and cooling of the vehicle interior.

The heat pump controller 32 controls, based on the temperature (the heat absorber temperature Te) of the heat absorber 9 which is detected by the heat absorber temperature sensor 48, and a target heat absorber temperature TEO being a target temperature (a target value of the heat absorber temperature Te) of the heat absorber 9, the number of revolutions of the compressor 2 to set the heat absorber temperature Te to the target heat absorber temperature TEO, and controls, based on the radiator pressure Pci (the high pressure of the refrigerant circuit R) detected by the radiator pressure sensor 47 and the target radiator pressure PCO (the target value of the radiator pressure Pci), the valve position of the outdoor expansion valve 6 to set the radiator pressure Pci to the target radiator pressure PCO, thereby obtaining a required amount of reheat by the radiator 4 (reheating amount).

Further, when the heating capability (the capability for reheating) by the radiator 4 runs shorter than a heating capability required even in the dehumidifying and cooling mode, the heat pump controller 32 complements its lack by the generation of heat by the auxiliary heater 23. Consequently, the vehicle interior is dehumidified and cooled without lowering the temperature of the vehicle interior too much.

(1-4) Cooling Mode

Figure 4:
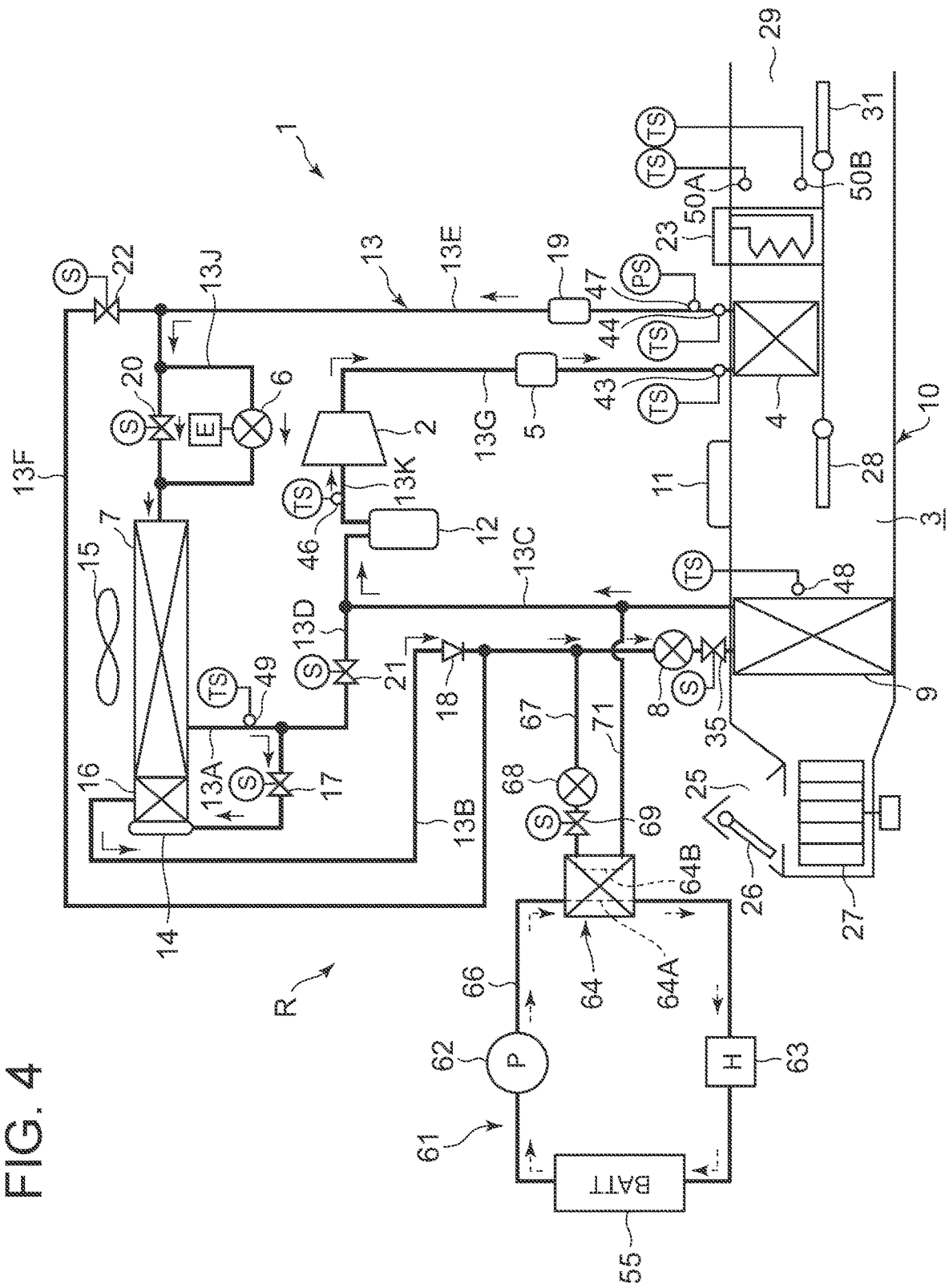
FIG. 4 is a constitutional diagram of the air conditioner for the vehicle to explain how a refrigerant flows in a cooling mode.

Next, description will be made as to the cooling mode with reference to FIG. 4. FIG. 4 shows how the refrigerant flows in the refrigerant circuit R in the cooling mode (solid line arrows). In the cooling mode, the heat pump controller 32 opens the solenoid valve 17, the solenoid valve 20, and the solenoid valve 35, and closes the solenoid valve 21, the solenoid valve 22, and the solenoid valve 69. Then, the compressor 2 and the respective blowers 15 and 27 are operated. The air mix damper 28 has a state of adjusting the ratio at which the air blown out from the indoor blower 27 is to be passed through the radiator 4 and the auxiliary heater 23. Incidentally, the auxiliary heater. 23 is not energized.

In consequence, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore only passes the radiator, and the refrigerant flowing out from the radiator 4 flows through the refrigerant pipe 13E to reach the refrigerant pipe 13J. At this time, the solenoid valve 20 is opened, and hence, the refrigerant passes the solenoid valve 20 and flows into the outdoor heat exchanger 7 as it is, in which the refrigerant is cooled by the running therein or the outdoor air to pass through the outdoor blower 15, to condense and liquefy.

The refrigerant flowing out from the outdoor heat exchanger 7 flows through the refrigerant pipe 13A, the solenoid valve 17, the receiver drier portion 14, and the subcooling portion 16 to enter the refrigerant pipe 13B, and reach the indoor expansion valve 8 through the check valve 18. The refrigerant is decompressed in the indoor expansion valve 8 and then flows into the heat absorber 9 through the solenoid valve 35 to evaporate. The air which is blown out from indoor blower 27 and exchanges heat with the heat absorber 9 is cooled by the heat absorbing operation at this time.

The refrigerant evaporated in the heat absorber 9 flows through the refrigerant pipe 13C to reach the accumulator 12, and flows therethrough to be sucked into the compressor 2 through the refrigerant pipe 13K, thereby repeating this circulation. The air cooled in the heat absorber 9 is blown out from the air outlet 29 to the vehicle interior, thereby performing the cooling of the vehicle interior. In this cooling mode, the heat pump controller 32 controls the number of revolutions of the compressor 2 on the basis of the temperature (the heat absorber temperature Te) of the heat absorber 9 which is detected by the heat absorber temperature sensor 48.

(1-5) Changing of Air Conditioning Operation

The heat pump controller 32 calculates the above-mentioned target outlet temperature TAO from the following equation (I). The target outlet temperature TAO is a target value of the temperature of the air to be blown out from the air outlet 29 to the vehicle interior.

$$TAO=(Tset-Tin)\times K+Tbal(f(Tset,SUN,Tam)) \quad (I)$$

where Tset is a predetermined temperature of the vehicle interior which is set by the air conditioning operating unit 53. Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature TAO becomes.

Then, the heat pump controller 32 selects any air conditioning operation from the above respective air conditioning operations on the basis of the outdoor air temperature Tam detected by the outdoor air temperature sensor 33 and the target outlet temperature TAO on startup. Further, after the startup, the heat pump controller changes the modes of the air conditioning operations in accordance with changes of operating conditions, environment conditions, and setting conditions such as the outdoor air temperature Tam, the target outlet temperature TAO, the heat medium temperature Tw, and the battery temperature Tcell.

(2) Defrosting Mode

Next, the defrosting mode of the outdoor heat exchanger 7 will be described. As described above, in the heating mode, the refrigerant evaporates in the outdoor heat exchanger 7 and absorbs heat from the outdoor air to become a low temperature, so that the moisture in the outdoor air adheres) the outdoor heat exchanger 7 as frost. Therefore (the heat pump controller 32 calculates a difference ΔTXO (=TXObase−TXO) between the outdoor heat exchanger temperature TXO (the refrigerant evaporation temperature in the outdoor heat exchanger 7) detected by the outdoor heat exchanger temperature sensor 49 and the refrigerant evaporation temperature TXObase at the time of non-frosting of the outdoor heat exchanger 7. When a state in which the outdoor heat exchanger temperature TXO is lower than the refrigerant evaporation temperature TXObase at the time of non-frosting, and the difference ΔTXO expands to a predetermined value or more is continued for a predetermined time, the heat pump controller 32 judges that the outdoor heat exchanger 7 is frosted, and sets a predetermined frosting flag.

Then, when in a state in which the frosting flag is set and an air conditioning switch of the air conditioning operating unit 53 is turned OFF, a plug for charging is connected to the Quick charger, and the battery 55 is charged, the heat pump controller 32 executes the defrosting mode of the outdoor heat exchanger. 7 as follows.

In this defrosting mode, the heat pump controller 32 sets the refrigerant circuit R to the state of the heating node described above, and then fully opens the valve position of the outdoor expansion valve 6. Then, the compressor 2 is operated, and the high-temperature refrigerant discharged from the compressor 2 is allowed to flow into the outdoor heat exchanger 7 via the radiator 4 and the outdoor expansion valve 6 to melt frost formed on the outdoor heat exchanger 7. Then, when the outdoor heat exchanger temperature TXO detected by the outdoor heat exchanger temperature sensor 49 becomes higher than a predetermined defrosting end temperature (for example, +3° C. or the like), the heat PUMP controller 32 terminates the defrosting mode assuming that the defrosting of the outdoor heat exchanger 7 has been completed.

(3) Battery Cooling Operation

Next, the battery cooling operation will be described. The battery cooling operation of the embodiment has two operation modes of a cooperative mode and a battery cooling single mode. First, description will be made about how the refrigerant in each operation mode flows.

(3-1) Cooperative Mode

Figure 6:
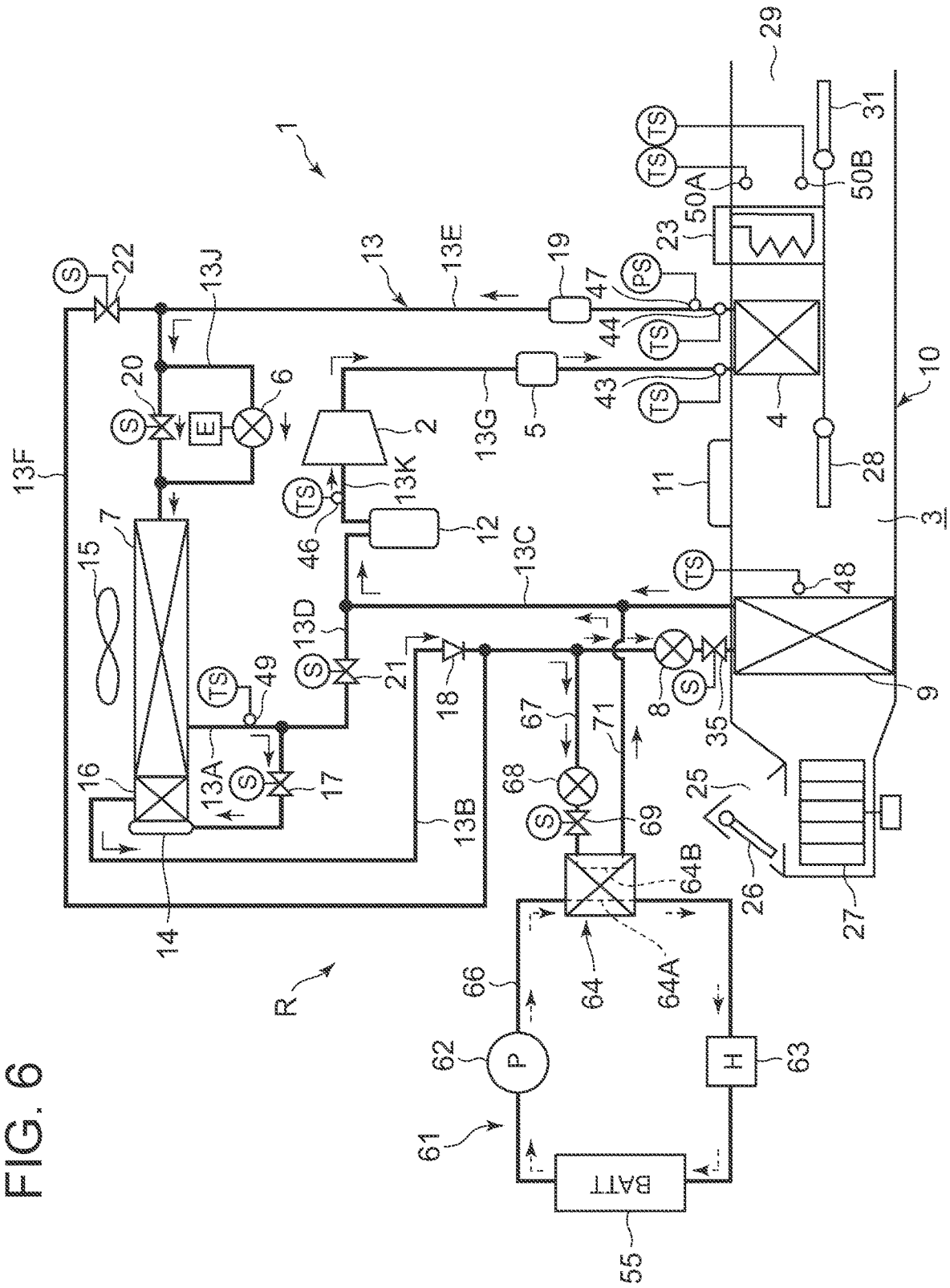
FIG. 6 is a constitutional diagram of the air conditioner for the vehicle to explain how the refrigerant flows in a cooperative mode.

Next, description will be made as to the cooperative mode of the battery cooling operation with reference to FIG. 6. FIG. 6 shows how the refrigerant flows in the refrigerant circuit R in the cooperative mode (solid line arrows). In the cooperative mode, the heat pump controller 32 opens the solenoid valve 17 and the solenoid valve 20, and closes the solenoid valve 21 and the solenoid valve 22. Further, the solenoid valve 35 and the solenoid valve 69 are controlled to open and close as described later.

Then, the compressor 2 and the respective blowers 15 and 27 are operated. The air mix damper 28 has a state of adjusting the ratio at which the air blown out from the indoor blower 27 is to be passed through the radiator 4 and the auxiliary heater 23. Incidentally, in this operation mode, the auxillary heater 23 is not energized. Further, the heat medium heating heater 63 is not energized either.

Thus, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore only passes the radiator, and the refrigerant flowing out from the radiator 4 flows through the refrigerant pipe 13E to reach the refrigerant pipe 13J. At this time, the solenoid valve 20 is opened, and hence, the refrigerant passes the solenoid valve 20 and flows into the outdoor heat exchanger 7 as it is, in which the refrigerant is cooled by the running therein or the outdoor air ventilated by the outdoor blower 15 to condense and liquefy.

The refrigerant flowing out from the outdoor heat exchanger 7 flows through the refrigerant pipe 13A, the solenoid valve 17, the receiver drier portion 14, and the subcooling portion 16 to enter the refrigerant pipe 13B. The refrigerant flowing in the refrigerant pipe 13B is distributed after passing through the check valve 18, and one of the distributed refrigerant flows through the refrigerant pipe 13B as it is to reach the indoor expansion valve 8. The refrigerant flowing into the indoor expansion valve 8 is decompressed there and then flows into the heat absorber 9 via the solenoid valve 35 to evaporate. The air which is blown out from the indoor blower 27 and exchanges heat with the heat absorber 9 is cooled by the heat absorbing operation at this time.

The refrigerant evaporated in the heat absorber 9 flows through the refrigerant pipe 13C to reach the accumulator 12, and flows therethrough to be sucked into the compressor 2 through the refrigerant pipe 13K, thereby repeating this circulation. The air cooled in the heat absorber 9 is blown out from the air outlet 29 to the vehicle interior, thereby performing the cooling of the vehicle interior.

On the other hand, the residual at the refrigerant which has passed through the check valve 18 is distributed and flows into the branch pipe 67 to reach the auxiliary expansion valve 68. Here, after the refrigerant is decompressed, it flows into the refrigerant flow passage 64B of the refrigerant-heat medium heat exchanger 64 through the solenoid valve 69 to evaporate there. At this time, it exerts a heat absorbing operation. The refrigerant evaporated in the refrigerant flow passage 64B flows through the refrigerant pipe 71, the refrigerant pipe 13C, and the accumulator 12 in sequence to be sucked into the compressor 2 from the refrigerant pipe 13K, thereby repeating this circulation (indicated by the solid line arrows in FIG. 6).

On the other hand, since the circulating pump 62 is in operation, the heat medium discharged from the circulating pump 62 reaches the heat medium flow passage 64A of the refrigerant-heat medium heat exchanger 64 in the heat medium pipe 66, where it exchanges heat with the refrigerant evaporated within the refrigerant flow passage 64B and absorbs heat to be cooled. The heat medium flowing out from the heat medium flow passage 64A of the refrigerant-heat medium heat exchanger. 64 reaches the heat medium heating heater 63. However, since the heat medium heating heater 63 does not generate heat in this operation mode, the heat medium passes through as it is and reaches the battery 55, which exchanges heat with the battery 55. Consequently, the battery 55 is cooled, and the heat medium after cooling the battery 55 is sucked into the circulating pump 62, thereby repeating this circulation (indicated by broken line arrows in FIG. 6).

Figure 5:
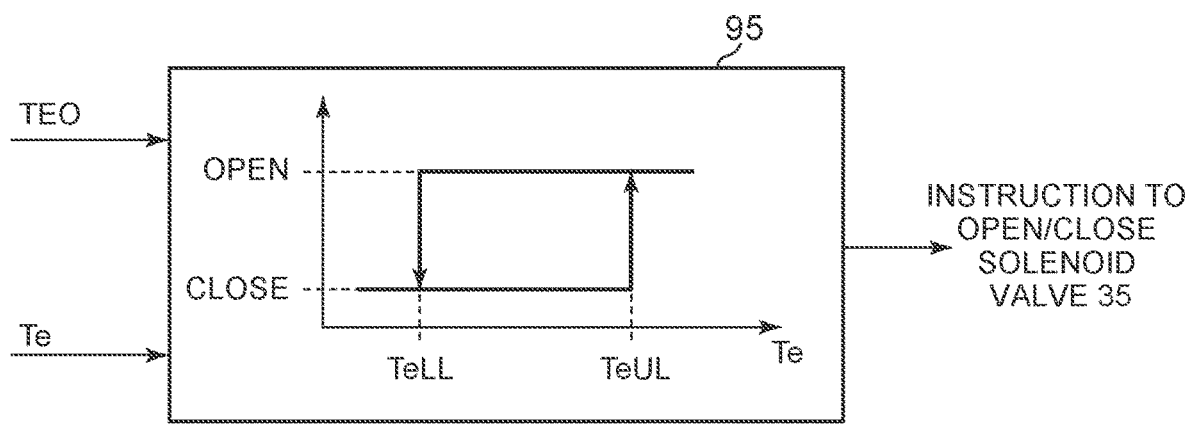
FIG. 5 is a block diagram to explain control of a solenoid valve 35 in a battery cooling operation.

In this cooperative mode, in the embodiment, the solenoid valve 35 is controlled to open and close as shown in FIG. 5 based on the temperature of the heat absorber 9 (heat absorber temperature Te) detected by the heat absorber temperature sensor 48.

That is, FIG. 5 shows a block diagram of opening/closing control of the solenoid valve 35 in the cooperative mode. The heat absorber temperature Te detected by the heat absorber temperature sensor 48 and the target heat absorber temperature TEO as the target value of the heat absorber temperature Te are input to a solenoid valve control unit 95 for the heat absorber of the heat pump controller 32. Then, the solenoid valve control unit 95 for the heat absorber sets an upper limit value TeUL and a lower limit value TeLL with a predetermined temperature difference above and below the target heat absorber temperature TEO. Then, when the heat absorber temperature Te becomes high from the state where the solenoid valve 35 is closed and rises to the upper limit value TeUL (when the heat absorber temperature exceeds the upper limit value TeUL or when the heat absorber temperature becomes the upper limit value TeUL or more. The same applies hereinafter), the solenoid valve 35 is opened. Thus, the refrigerant flows into the heat absorber 9 and evaporates to cool the air flowing through the air flow passage 3.

After that, when the heat absorber temperature Te drops to the lower limit value TeLL (when it falls below the lower limit value TeLL or when it becomes TeLL or less. The same applies hereinafter), the solenoid valve 35 is closed. Thereafter, such opening and closing of the solenoid valve 35 is repeated to control the heat absorber temperature Te to the target heat absorber temperature TEO to cool the vehicle interior.

Figure 7:
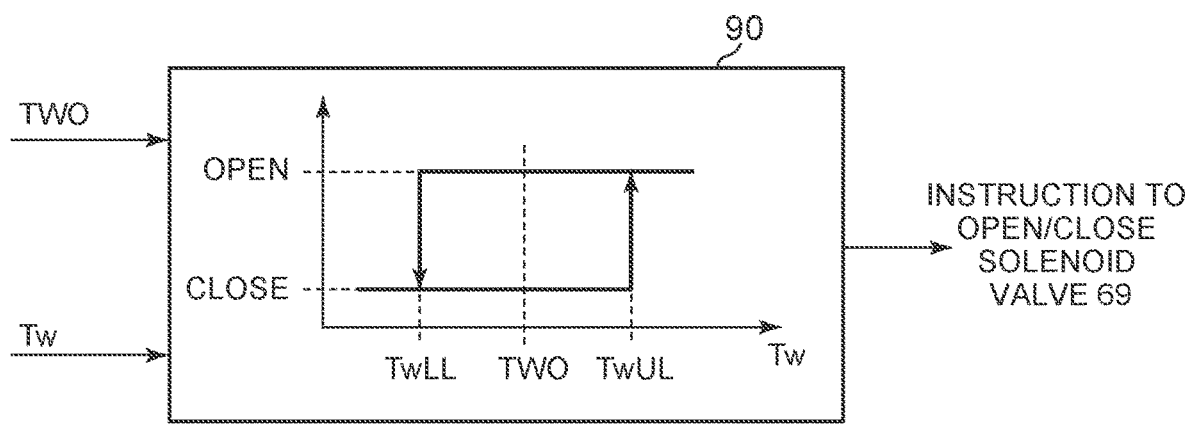
FIG. 7 is a block diagram to explain control of a solenoid valve 69 in a battery cooling operation.

Further, in the embodiment, the solenoid valve 69 is controlled to open and close as shown in FIG. 7 based on the temperature of the heat medium (heat medium temperature Tw: transmitted from the battery controller 7: detected by the heat medium temperature sensor 76.

Incidentally, the above-mentioned heat absorber temperature Te is the temperature of the heat absorber 9 or the temperature of the object (air) to be cooled by the temperature in the embodiment. Further, the heat medium temperature Tw is adopted as the temperature of the target (heat medium) to be cooled by the refrigerant-heat medium heat exchanger 64 (heat exchanger for a temperature-controlled object) the embodiment, but is also an index indicating the temperature of the battery 55 being an object to be temperature-controlled (the same applies hereinafter).

FIG. 7 shows a block diagram of opening/closing control of the solenoid valve 69 in the cooperative mode. The heat medium temperature Tw detected by the heat medium temperature sensor 76 and a predetermined target heat medium temperature TWO as a target value of the heat medium temperature Tw are input to a solenoid valve control unit 90 for a temperature-controlled object, of the heat pump controller 32. Then, the solenoid valve control unit 90 for the temperature control sets an upper limit value TwUL and a lower limit value TwLL with a predetermined temperature difference above and below the target heat medium temperature TWO. When the heat medium temperature Tw becomes high from the state where the solenoid valve 69 is closed due to heat generation of the battery 55 or the like and rises to the upper limit value TwUL (when the heat medium temperature exceeds the upper limit value TwUL or when the heat medium temperature becomes the upper limit value TwUL or more, and the same applies hereinafter), the solenoid valve 69 is opened (instruction to open the solenoid valve 69). Thus, the refrigerant flows into the refrigerant flow passage 64B of the refrigerant-heat medium heat exchanger 64 to evaporate and cools the heat medium flowing through the heat medium passage 64A, so that the battery 55 is cooled by the cooled heat medium.

Figure 8:
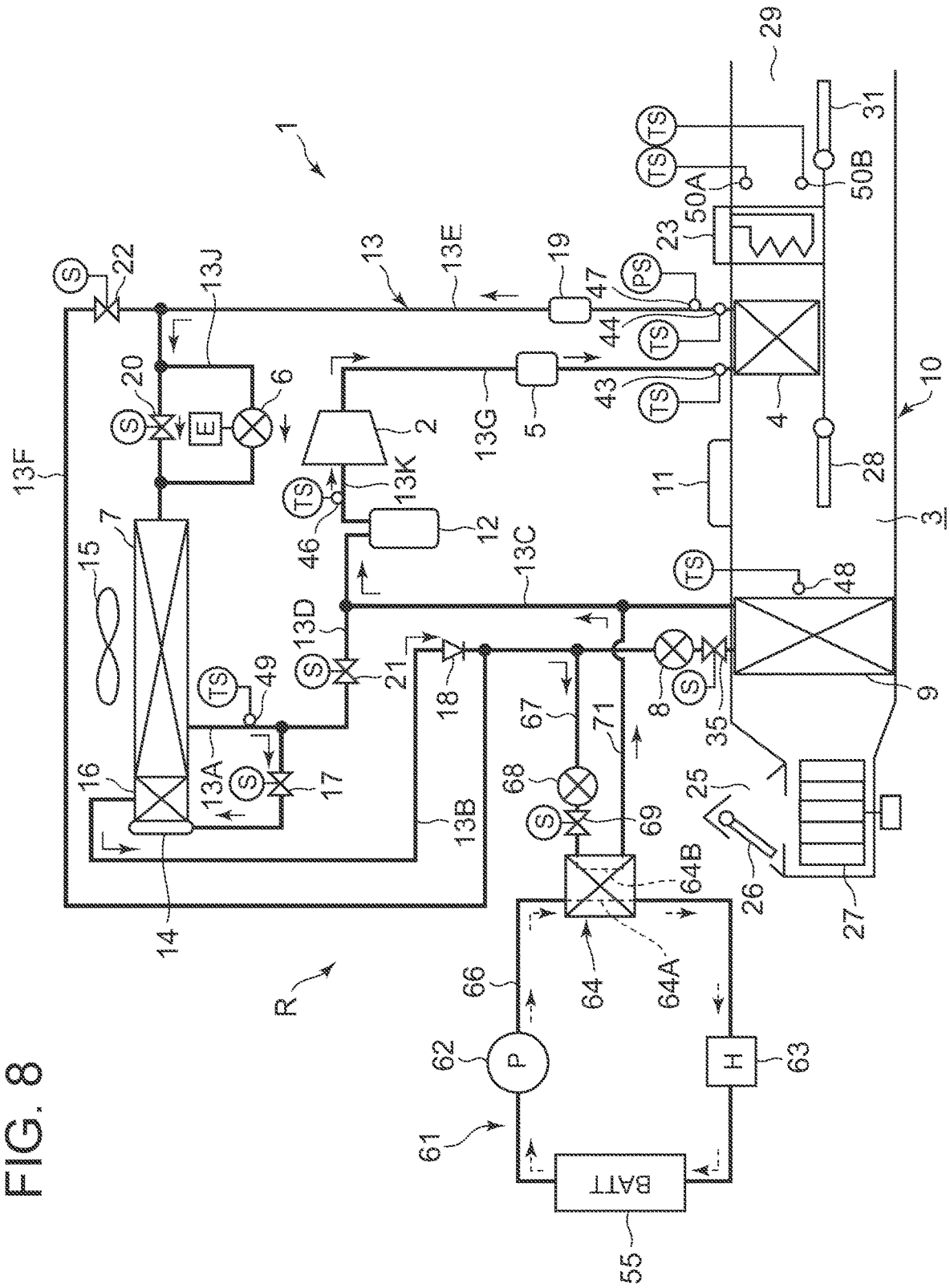
FIG. 8 is a constitutional diagram of the air conditioner for the vehicle to explain how the refrigerant flows in a battery cooling single mode.

Thereafter, when the heat medium temperature Tw drops to the lower vale TwLL (when the heat medium temperature Tw falls below the lower limit value TwIL or when the heat medium temperature Tw reaches the lower limit value TwLL or less, and the same applies hereinafter), the solenoid valve 69 is closed. (instruction to close the solenoid valve 69). After that, such opening and closing of the solenoid valve 69 is repeated to control the heat medium temperature Tw to the target heat medium temperature TWO to cool the battery 55, (3-2) Battery Cooling Single Mode Net, the battery cooling single mode of the battery cooling operation will be described with reference to FIG. 8 FIG. 8 shows how the refrigerant flows in the refrigerant circuit R in the battery cooling single mode (solid line arrows). In the battery cooling single mode, the heat pump controller 32 opens the solenoid valve 17, the solenoid valve 20, and the solenoid valve 69, and closes the solenoid valve 21, the solenoid valve 22, and the solenoid valve 35.

Then, the compressor 2 and the outdoor blower 15 are operated. Incidentally, the indoor blower 27 is not operated, and the auxiliary heater 23 is not energized either. Further, in this operation mode, the heat medium heating heater 63 is not energized either.

Thus, the high-temperature high-pressure gas refrigerant discharged from the compressor 2 flows into the radiator 4. Since the air in the air flow passage 3 is not passed through the radiator 4, the refrigerant only passes, and the refrigerant flowing out from the radiator 4 flows through the refrigerant pipe 13E to reach the refrigerant pipe 13J. At this time, the solenoid valve 20 is opened, and hence, the refrigerant passes the solenoid valve 20 and flows into the outdoor heat exchanger 7 as it is, in which the refrigerant is cooled by the outdoor air ventilated by the outdoor blower 15 to condense and liquefy.

The refrigerant flowing out from the outdoor heat exchanger 7 flows through the refrigerant pipe 13A, the solenoid valve 17, the receiver drier portion 14, and the subcooling portion 16 to enter the refrigerant pipe 13B. The refrigerant flowing in the refrigerant pipe 13B passes through the check valve 18 and then all flows into the branch pipe 67 to reach the auxiliary expansion valve 68. Here, after the refrigerant is decompressed, it flows into the refrigerant flow passage 64B of the refrigerant-heat medium heat exchanger 64 through the solenoid valve 69 to evaporate there. At this time, it exerts a heat absorbing operation. The refrigerant evaporated in the refrigerant flow passage 64B flows through the refrigerant pipe 71, the refrigerant pipe 13C, and the accumulator 12 in sequence to be sucked into the compressor 2 from the refrigerant pipe 13K, thereby repeating this circulation (indicated by the solid line arrows in FIG. 8).

On the other hand, since the circulating pump 62 is in operation, the heat medium discharged from the circulating pump 62 reaches the heat medium flow passage 64A of the refrigerant-heat medium heat exchanger 64 in the heat medium pipe 66, where the heat is absorbed by the refrigerant evaporated within the refrigerant flow passage 643, so that the heat medium is cooled. The heat medium flowing out from the heat medium flow passage 64A of the refrigerant-heat medium heat exchanger 64 reaches the heat medium heating heater 63. However, since the heat medium heating heater 63 does not generate heat in this operation mode, the heat medium passes through as it is and reaches the battery 55, where it exchanges heat with the battery 55. Consequently, the battery 55 is cooled, and the heat medium after cooling the battery 55 is sucked into the circulating pump 62, thereby repeating this circulation (indicated by broken line arrows in FIG. 8).

In this battery cooling (single) mode, the heat pump controller 32 fixes the solenoid valve 69 to an open state to cool the battery 55.

(3-3) Control of Compressor 2 by Heat Pump Controller 32 in Cooperative Mode of Battery Cooling Operation.

Next, referring to FIGS. 9 and 10, the control of the compressor 2 by the heat pump controller 32 in the cooperative mode of the battery cooling operation will be described.

(3-3-1) Control Block of Compressor 2

Figure 9:
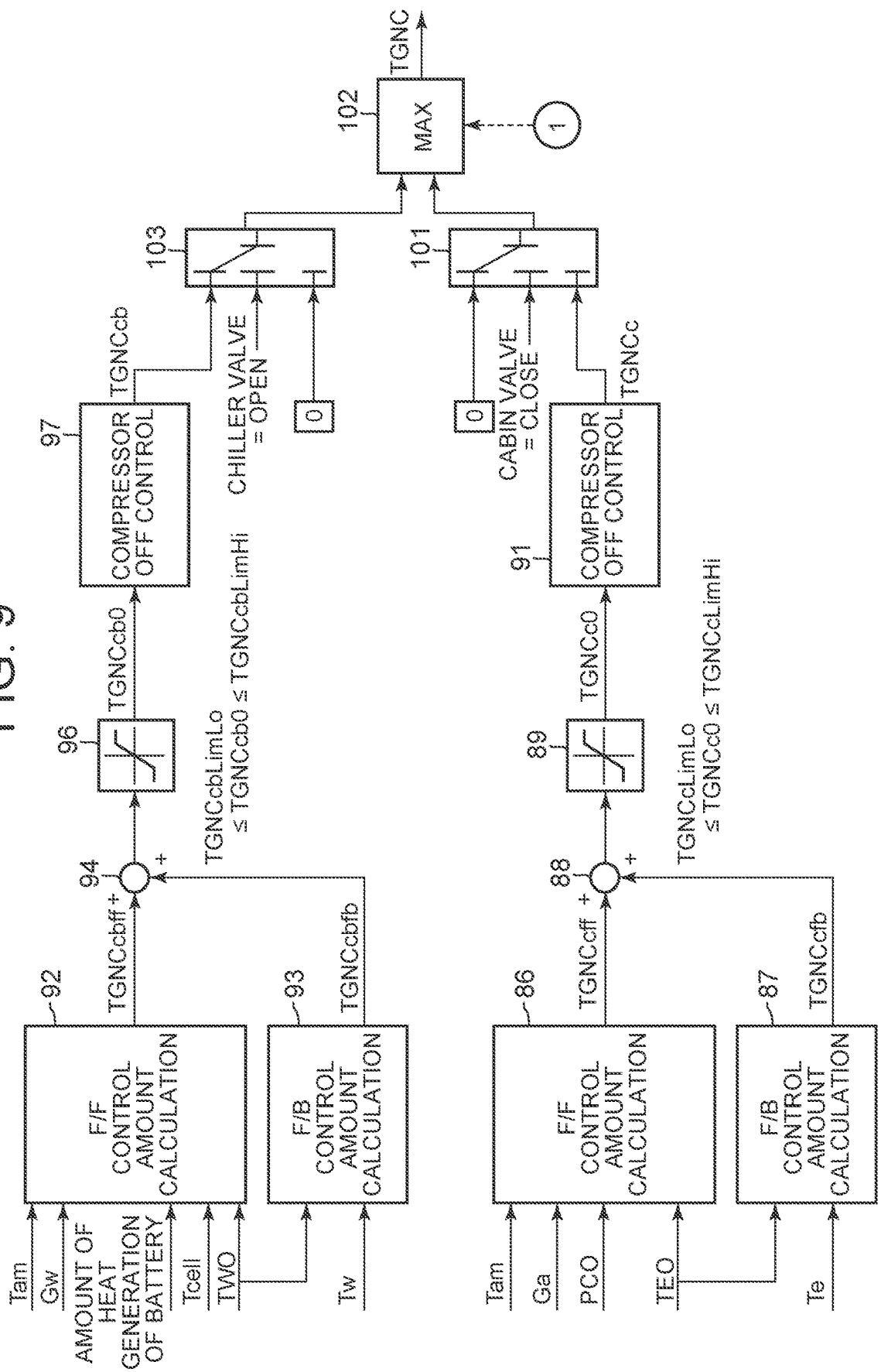
FIG. 9 is a control block diagram for calculating the compressor target number of revolutions in the cooperative mode of the battery cooling operation.

FIG. 9 is a control block diagram of the heat pump controller 32 which calculates a target number of revolutions (a compressor target number of revolutions) TGNC of the compressor 2. First, the lower side of FIG. 9 is a control block diagram to calculate a target number of revolutions (a compressor target number of revolutions) TGNCc of the compressor 2 on the basis of the heat absorber temperature Te. An F/F (FeedForward) control amount calculation section 86 of the heat pump controller 32 calculates an F/F control amount TGNCcff of the compressor target number of revolutions on the basis of the outdoor air temperature Tam, the air volume Ga (which may be a blower voltage BLV of the indoor blower 27) of the air flowing in the air flow passage 3, the target radiator pressure PCO, and the target heat absorber temperature TEO which is the target value of the heat absorber temperature Te.

Further, an F/B (FeedBack) control amount calculation section 87 calculates an F/B control amount TGNCcfb of the compressor target number of revolutions by PID (proportional integral differentiation) calculation or PI (proportional integral) calculation based on the target heat absorber temperature TEO and the heat absorber temperature Te. Then, the F/F control amount TGNCcff calculated by the F/F control amount calculation section 86 and the F/B control amount TGNCcfb calculated by the F/B control amount calculation section 87 are added by an adder 88 to be input to a limit setting unit 89.

In the limit setting unit 89, the above result of addition is added with limits of a lower limit number of revolutions TGNCcLimLo of controlling and an upper limit number of revolutions TGNCcLimHi thereof to be set as TGNCcO, followed by being determined as the compressor target number of revolutions TGNCc through a compressor OFF control section 91. Incidentally, since the F/D control amount TGNCcfb cannot be obtained at the start of operation, the F/F control amount TGNCcff is determined as the compressor target number of revolutions TGNCc. The determined compressor target number of revolutions TGNCc enters one input of 101 denoted as a switcher. In the embodiment, "0" is input to the other input of the switcher 101. The switcher 101 selects and outputs "0" when the solenoid valve 35 (cabin valve) is closed (TGNCc=0), and outputs TGNCc when it is open. This TGNCc is the target number of revolutions of the compressor 2 (target number of revolutions corresponding to the heat absorber 9) required to control the heat absorber temperature Te. Then, the output of the switcher 101 is input to a maximum value selection unit 102.

Next, the upper side of FIG. 9 is a control block diagram of the heat pump controller 32 which calculates a target number of revolutions (compressor target number of revolutions) TGNCcb of the compressor 2 based on the heat medium temperature Tw. An F/F control amount calculation section 92 of the heat, pump controller 32 calculates an F/F control amount TGNCcbff of the compressor target number of revolutions on the basis of the outdoor air temperature Tam, a flow rate Gw of the heat medium in the equipment temperature adjusting device 61 (calculated from the output of the circulating pump 62), the amount of heat generated in the battery 55 (transmitted from the battery controller 73), the battery temperature Tcell (transmitted from the battery controller 73), and the target heat medium temperature TWO as the target value of the heat medium temperature Tw.

Further, an F/B control amount calculation section 93 calculates an F/B control amount TGNCcbfb of the compressor target number of revolutions by the PID calculation or the PI calculation based on the target heat medium temperature TWO and the heat medium temperature Tw (transmitted from the battery controller 73). Then, the F/F control amount TGNCcbff calculated by the F/F control amount calculation section 92 and the F/B control amount TGNCcbfb calculated by the F/B control amount calculation section 93 are added by an adder 94 to be input to a limit setting unit 96.

In the limit setting unit 96, the above result of addition is added with limits of a lower limit number of revolutions TGNCcbLimLo of controlling and an upper limit number of revolutions TGNCcbtimHi thereof to be set as TGNCcb0, followed by being determined as a compressor target number of revolutions TGNCcb through a compressor OFF control section 97, incidentally, since the F/B control amount TGNCcbfb is not obtained at the start of operation, the F/F control amount TGNCcbff is determined as the compressor target number of revolutions TGNCcb. The determined compressor target number of revolutions TGNCcb enters one input of 103 denoted as a switcher. In the embodiment, '0' is input to the other input of the switcher 103. The switcher 103 selects and outputs "0" when the solenoid valve 69 (chiller valve) is closed (TGNCcb=0), and outputs TGNCcb when it is open. This TGNCcb is the target number of revolutions of the compressor 2 (target number of revolutions corresponding to the refrigerant-heat medium heat exchanger 64) required to cool the heat medium. Then, the output of the switcher 103 is also input to the maximum value selection unit 102.

The maximum value selection unit 102 selects the maximum value from the input values and outputs the same as a compressor target number of revolutions TGNC. The heat pump controller 32 controls the operation (number of revolutions) of the compressor 2 by the compressor target number of revolutions TGNC selected by the maximum value selection unit 102.

(3-3-2) Determination of Compressor Target Number of Revolutions TGNC

Next, referring to the flowchart of FIG. 10, description will be made as to determination control of the target number of revolutions (compressor target number of revolutions) TGNC of the compressor 2 in the cooperative mode of the battery cooling operation by the heat pump controller 32. Incidentally, in this example, it is assumed that an air conditioning request has been issued. This air conditioning request is, for example, that an air conditioning switch (air conditioner ON switch) of the air conditioning operating unit 53 is pressed, and is input from the air conditioning controller 45 to the heat pump controller 32.

Figure 10:
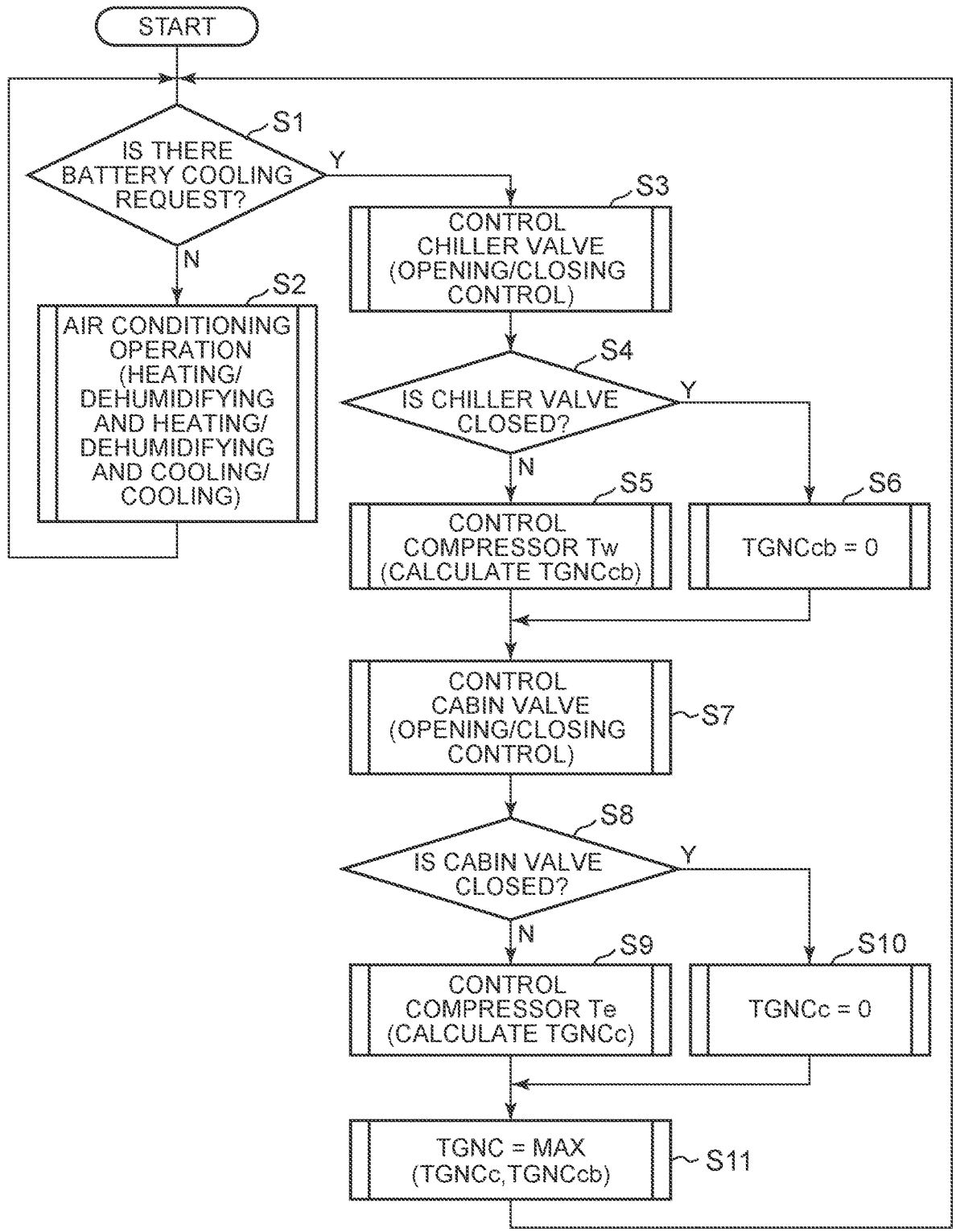
FIG. 10 is a flowchart to explain decision control of the compressor target number of revolutions in the cooperative mode of the battery cooling operation.

The heat pump controller 32 judges in Step S1 of FIG. 10 whether the battery cooling request from the battery controller 73 has been input. In this case, the battery controller 73 outputs a battery cooling request when, for example, the heat medium temperature Tx or the battery temperature Tcell rises to a predetermined value or more, and transmits the same to the heat pump controller 32 or the air conditioning controller 45. When there is no battery cooling request in Step S1, the heat pump controller 32 proceeds to Step S2 and executes the above-mentioned air conditioning operation (heating mode, dehumidifying and heating mode, dehumidifying and cooling mode, cooling mode).

On the one hand, when the battery cooling request is made in Step S1, the heat pump controller 32 proceeds to Step S3 to shift to the cooperative mode, and executes the opening closing control of the solenoid valve 69 (chiller valve) of FIG. 7 described above. Next, in Step S4, it is judged whether or not the solenoid valve 69 is closed. Then, when the solenoid valve 69 is open, the heat pump controller proceeds to Step 35 to calculate the compressor target number of revolutions TGNCcb based on the heat medium temperature Tw in the control block of FIG. 9, and to change the switcher 105 so as to output the compressor target number of revolutions TGNCcb.

On the other hand, when the solenoid valve 69 is closed in Step S4, the heat pump controller proceeds to Step S6 to stop the calculation of the compressor target number of revolutions TGNCcb based on the heat medium temperature Tw in the control block of FIG. 9, and to change the switcher 103 so as to output "0" (TGNCcb=0).

Next, the heat pump controller proceeds to Step S7 to execute the opening/closing control of the solenoid valve 35 (cabin valve) of FIG. 5 described above. Next, in Step 03, it is judged whether or not the solenoid valve 35 is closed. Then, when the solenoid valve 35 is open, the heat pump controller proceeds to Step S9 to calculate the compressor target number of revolutions TGNCc based on the heat absorber temperature Te in the control block of FIG. 9, and to switch the switcher 101 so as to output the compressor target number of revolutions TGNCc.

On the other hand, when the solenoid valve 35 is closed in Step S8, the heat pump controller proceeds to Step S10 to stop the calculation of the compressor target number of revolutions TGNCc based on the heat absorber temperature Te in the control block of FIG. 9, and to switch the switcher 101 so as to output "0" (TGNCc=0).

Then, finally, the heat pump controller proceeds to Step S11, and the heat pump controller 32 selects the maximum value of the compressor target numbers of revolutions TGNCc and TGNCcb by the maximum value selection unit. 102, and determines it as the compressor target number of revolutions TGNC. Incidentally, when the solenoid valves 69 and 35 are closed, the compressor target numbers of revolutions TGNCc and TGNCcb are both set to "0" in Steps S6 and S10, so that the compressor 2 is stopped.

Further, in terms of the compressor target number of revolutions TGNCc or TGNCcb which was not the maximum value in the judgment of Step S11, the heat pump controller 32 stops the integral calculation in the F/B control amount calculation section. 87 or 93 in FIG. 9.

As described above, the heat pump controller 32 of the embodiment calculates each of the target numbers of revolutions TGNCc and TGNCcb of the compressor 2 required to control the temperature of the heat absorber 9 and the temperature of the heat medium cooled by the refrigerant-heat medium heat exchanger 64 in the cooperative mode of the battery cooling operation, and selects the maximum value of them to control the operation of the compressor 2. Therefore, in the air conditioner 1 for the vehicle having a plurality of evaporators like the heat absorber 9 and the refrigerant-heat medium heat exchanger 64, even if the load in them fluctuates, the inconvenience that the shortage of the cooling capacity occurs in all of them is solved, and the vehicle interior air conditioning by the heat absorber 9 and the cooling control of the battery 55 by the refrigerant-heat medium heat exchanger 64 can be appropriately realized.

Further, since the solenoid valves 35 and 69 are provided and controlled based on the heat absorber temperature Te, the heat medium temperature Tw, and the presence or absence of the cooling request due to them, it is possible to appropriately perform the cool ng control by the heat absorber 9 and the ref rigs medium heat exchanger 64, exchanger 64.

In this case, when the solenoid valve 35 and the solenoid valve 69 are open, the heat pump controller 32 calculates the compressor target numbers of revolutions TGNCc and TGNCcb corresponding to the heat absorber 9 and the refrigerant-heat medium heat exchanger 64 corresponding to them. Therefore the solenoid valves 35 and 69 are closed. In terms of those which do not need to generate cooling action, the target number of revolutions is not calculated and unnecessary arithmetic processing by the heat pump controller 32 can be eliminated.

Further, when the solenoid valve 35 and the solenoid valve 69 are closed, the heat pump controller 32 sets the compressor target numbers of revolutions TGNCc and TGNCcb to C. Therefore, it is possible to reliably avoid the inconvenience of selecting the compressor target numbers of revolutions TGNCc and TGNCcb corresponding to the heat absorber 9 and the refrigerant-heat medium heat exchanger 64 which do not need to generate the cooling action.

In addition, since the heat pump controller 32 stops the integral calculation in the calculation of the compressor target numbers of revolutions TGNCc and TGNCcb which are not the maximum values, the deterioration of controllability can be avoided in advance.

Furthermore, since the heat pump controller 32 controls the operation of the compressor 2 by selecting the maximum value of the F/F control amounts TGNCcff and TGNCcbff at the start of operation, it is possible to eliminate the inconvenience that the shortage of the cooling capacity occurs in the heat absorber 9 and the refrigerant-heat medium heat exchanger 64 from the start of operation and to realize appropriate temperature control by them.

(3-4) Battery Alarm Control.

Here, description will be made as to the battery alarm control by the heat pump controller 32 with reference to FIG. 11. For example, in the above-mentioned control, when the battery temperature Tcell becomes equal to or higher than a predetermined upper limit value TcellUL, or becomes higher than the upper limit value TcellUL for some reason in the state in which the compressor target number of revolutions TGNCc based on the heat absorber temperature Te is selected as the maximum value, a battery alarm is transmitted from the battery controller 73 to the heat pump controller 32.

Figure 11:
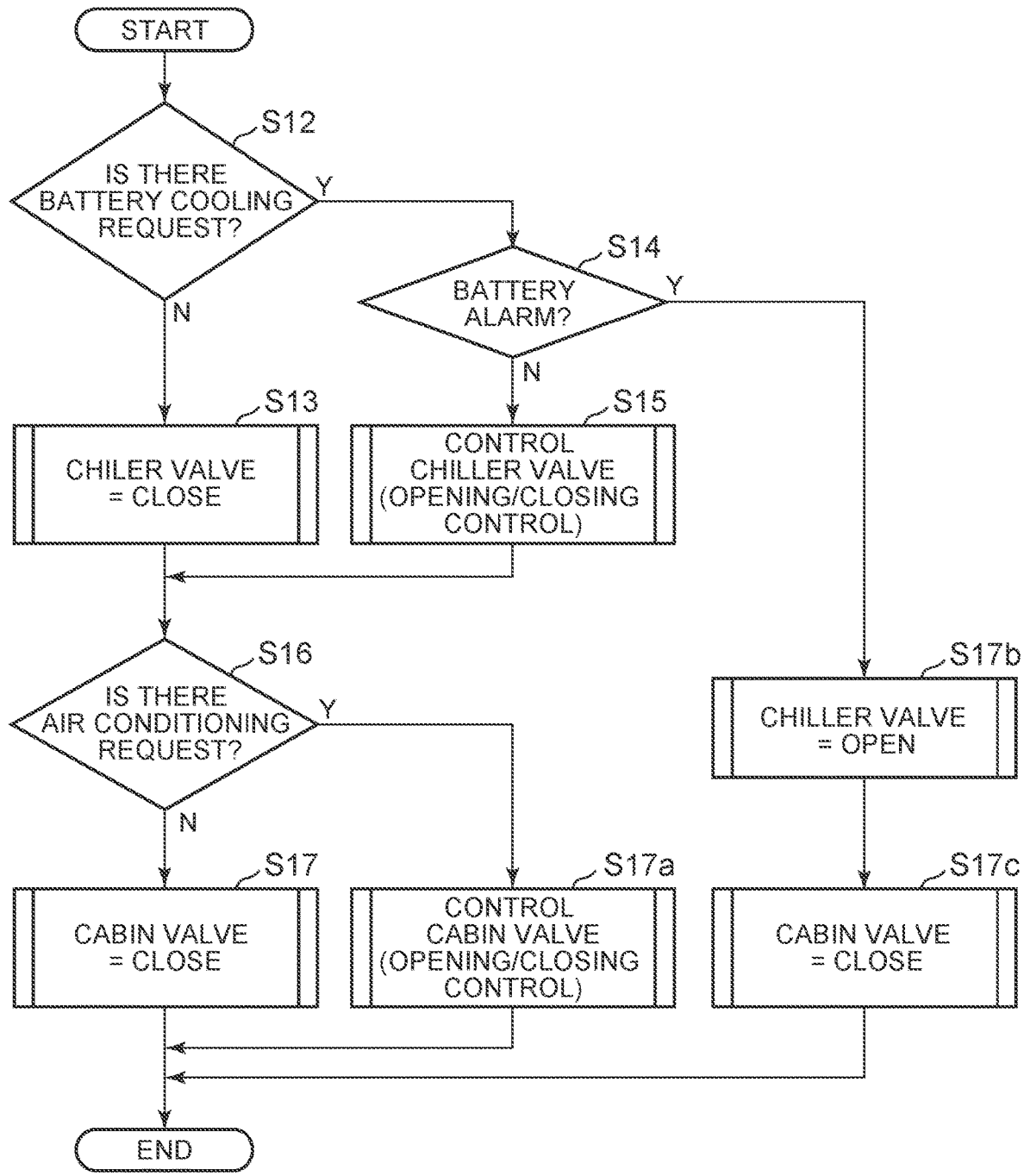
FIG. 11 is a flowchart to explain battery alarm control.

The heat pump controller 32 judges whether or not there is a battery request in Step S12 of FIG. 11. When there is no battery cooling request from the battery controller 73, the heat pump controller 32 proceeds to Step S13 to close the solenoid valve 69 and proceeds to Step S16. On the other hand, when the battery request comes from the battery controller 73, the heat pump controller 32 proceeds from Step S12 to Step S14 to judge whether or not the battery alarm has come. Then, when the battery alarm has not come, the heat pump controller proceeds to Step S15 to execute the opening/closing control of the solenoid valve 69 (chiller valve) described above, and proceeds to Step S16.

In Step S16, it is judged whether or not there the above-mentioned air conditioning request. Then, when there is no air conditioning request, the heat pump controller proceeds tom. Step S17 to close the solenoid valve 35 (cabin valve). On the other hand, when there the air conditioning request, the heat pump controller 32 proceeds from Step 316 to Step S17a to execute the opening/closing control of the solenoid valve 35 described above. On the other hand, when the battery alarm is transmitted from the battery controller 73 in Step S14, the heat pomp controller 32 proceeds to Step S17b to fix the solenoid valve 69 (chiller valve) to an open state, and proceeds to Step S17c to fix the solenoid valve 35 (cabin valve) to a close state. This state is the battery cooling single mode described above.

That is, when the temperature Tcell of the battery 55 becomes equal to or higher than the predetermined upper limit value TcellUL, or becomes higher than the upper limit value TcellUL, the refrigerant is constantly circulated in the refrigerant-heat medium heat exchanger 6, and does not flow in the heat absorber F. As a result, the temperature of the battery 55 can be quickly lowered, the inconvenience that the temperature of the battery 55 rises excessively can be avoided in advance, deterioration of the battery 55 can be prevented, and the life of the battery 55 can be extended.

Embodiment 2

Figure 12:
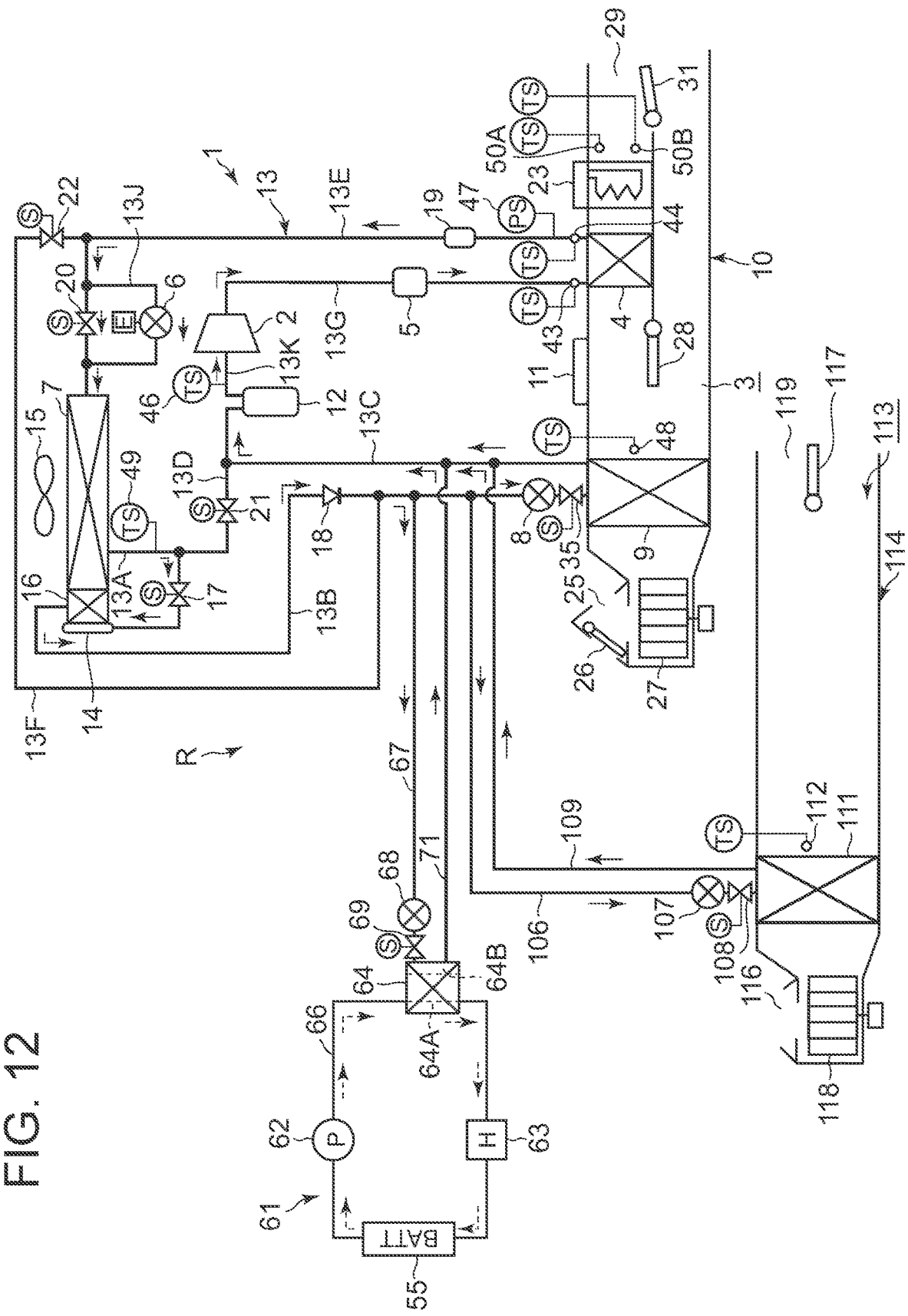
FIG. 12 is a constitutional diagram of an air conditioner for a vehicle of another embodiment to which the present invention is applied (Embodiment 2)

Next, another embodiment of the present Invention will be described with reference to FIGS. 12 to 15. FIG. 12 shows a constitutional diagram of an air conditioner 1 for a vehicle of another embodiment to which the present invention can be applied FIG. 12 is an example of the air conditioner 1 for the vehicle provided with a heat absorber 111 (shown by rear EVA in FIGS. 2 and 15) as a heat absorber for the rear seat, which is an evaporator for cooling the air supplied to a rear part (rear seat) of a vehicle interior. Incidentally, it is assumed that in this figure, those shown by the same reference numerals as those in FIG. 1 perform the same or similar functions. However, in this embodiment, a heat absorber 9 becomes a front seat heat absorber for cooling the air supplied to a front part (front seat) of the vehicle interior.

Then, 114 is an HVAC unit for the rear seat. The heat absorber 111 is provided in an air flow passage 113 of the HVAC unit 114 for the rear seat. The air flow passage 113 of the HVAC unit 114 for the rear seat is also formed with each suction port of an outdoor air suction port and an indoor air suction port on the air upstream side of the heat absorber 111 (represented by a suction port 116 in FIG. 12).

Further, there is provided on the air downstream side of an air inlet changing damper 117, an indoor blower (blower fan. It is shown by a rear indoor blower in FIG. 2) 113 for the rear seat for supplying the introduced indoor air and outdoor air to the air flow passage 113. Incidentally, 119 is a plurality of air outlets for the rear seat for blowing out the air in the air flow passage 113 passing through the heat absorber 111 to the rear part (rear seat) of the vehicle interior (represented by 119 in FIG. 12). The air outlet 119 is also provided with an air outlet changing damper 117 (indicated by a rear air outlet changing damper in FIG. 2) for changing and controlling the air blowout from each air outlet.

One end of a branch pipe 106 is connected to a refrigerant pipe 13B located on the refrigerant downstream side of a connecting part between a refrigerant pipe 13F and the refrigerant pipe 13E in a refrigerant circuit R and located on the refrigerant upstream side of an indoor expansion valve 8. In the embodiment, there are provided sequentially in the branch pipe 106, an indoor expansion valve 107 for the rear seat constituted of a mechanical expansion valve, and a solenoid valve (shown as a rear EVA valve in a flowchart and a control block diagram to be described later. The same applies hereinafter) 108 which is an opening/closing valve as a valve device. The solenoid valve 108 is a valve device for controlling the flow of a refrigerant to the heat absorber 111. The indoor expansion valve 107 decompresses and expands the refrigerant flowing into the heat absorber 111 and adjusts the superheat degree of the refrigerant in the heat absorber ill. Incidentally, in the embodiment, the indoor expansion valve 107 and the solenoid valve 108 are also configured by a solenoid valve-equipped expansion valve.

Then, the other end of the branch pipe 106 is connected to the heat absorber ill. One end of a refrigerant pipe 109 is connected to an outlet of the heat absorber 111, and the other end of the refrigerant pipe 109 is connected to a refrigerant pipe 130 on the refrigerant upstream side (the refrigerant upstream side of an accumulator 12) from a lining point with a refrigerant pipe 13D. Then, these indoor expansion value 107, solenoid valve 108, and heat absorber ill also form a part of the refrigerant circuit R.

When the solenoid valve 108 is opened, the refrigerant (some or all of the refrigerant) discharged from an outdoor heat exchanger 7 flow into the branch pipe 106 and is decompressed by the indoor expansion valve 107. Then, the refrigerant passes through the solenoid valve 108 and flows into the heat absorber 111 to evaporate there. The refrigerant absorbs heat from the air circulating in the air flow passage 113 in the process of flowing through the heat absorber 111. After cooling the refrigerant, it is sucked into a compressor 2 from a refrigerant pipe 13K via the refrigerant pipe 109, the refrigerant pipe 13C, and the accumulator 12.

Further, 112 is a heat absorber temperature sensor for the rear seat which detects the temperature of the heat absorber 111 (the refrigerant temperature of the heat absorber 111: a heat absorber temperature TeRr) (indicated by a rear heat absorber temperature sensor in FIG. 2), and which is connected to the input of a heat pump controller 32. In addition, the above-mentioned solenoid valve 108 is connected to the output of the heat pump controller 32, and the air outlet changing damper 117 and the indoor blower 118 are connected to the output of an air conditioning controller 45 so as to be controlled by them (shown by broken lines in FIG. 2).

(4) Air. Conditioning Operation and Battery Cooling Operation when there is Heat Absorber 111 for Rear Seat In this embodiment as well, each air conditioning operation of a heating mode, a dehumidifying and heating mode, a dehumidifying and cooling mode, and a cooling mode is performed in the same manner as in the above-described embodiment 1. In this cooling mode, for example, when an air conditioning switch (air conditioner ON switch) for the rear seat provided in an air conditioning operating unit 53 is pressed, and a cooling request (rear EVA cooling request) by the heat absorber 111 for the rear seat is transmitted to the heat pump controller 32, the heat pump controller 32 opens the solenoid valve 108 to allow the refrigerant to flow through the heat absorber 111 (indicated by solid line arrows in FIG. 12).

Further, in this embodiment as well, the battery cooling operation is performed in the same manner as in the above-described embodiment 1. However, in this embodiment, the solenoid valve 108 is also closed and fixed in the battery cooling single mode of the battery cooling operation of the above-described embodiment. Further, in the cooperative mode of the battery cooling operation of the above-described embodiment, a state in which the solenoid valve 108 is opened to allow the refrigerant to flow through the heat absorber 111, and a state in which the solenoid valve 108 is closed not to allow the refrigerant to flow through the heat absorber 111 become in the form of existence. That is, FIG. 12 shows by solid line arrows how the refrigerant flows in the state where the solenoid valve 108 is open in the cooperative mode, (4-1) Control of Solenoid Valve 108 for Rear Seat.

Figure 13:
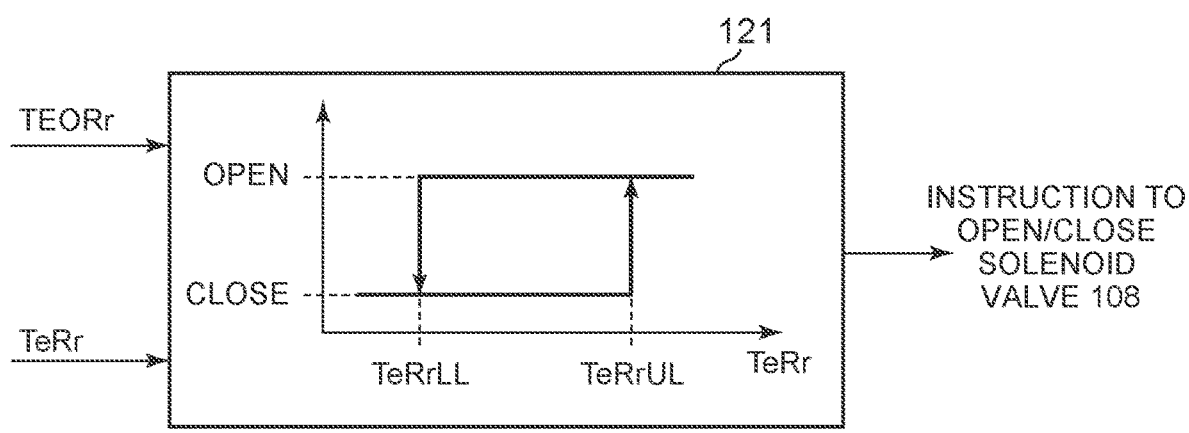
FIG. 13 is a block diagram to explain control of a solenoid valve 108 of the air conditioner for the vehicle of FIG. 12.

Next, description will be made as to opening/closing control of the solenoid valve 108 this embodiment with reference to FIG. 13. The solenoid valve 108 is controlled to open and close as shown in FIG. 13 based on the temperature of the heat absorber 111 (heat absorber temperature TeRr) detected by the heat absorber temperature sensor 112. That is FIG. 13 shows a block diagram the opening/closing control of the solenoid valve 108.

The temperature (heat absorber temperature TeRr) of the heat absorber 111 detected by the heat absorber temperature sensor 112 and a target heat absorber temperature TEORr as the target value of the heat absorber temperature TeRr are input to a solenoid valve control unit 121 for the heat absorber of the heat pump controller 32. Then, the solenoid valve control unit 121 for the heat absorber sets an upper limit value TeRrUL and a lower limit value TeRrLL with a predetermined temperature difference above and below the target heat absorber temperature TEORr. Then, when the heat absorber temperature TeRr becomes high from the state where the solenoid valve 108 is closed and rises to the upper limit value TeRrUL (when the heat absorber temperature exceeds the upper limit value TeRrUL or when the heat absorber temperature becomes the upper limit value TeRrUL or more. The same applies hereinafter), the solenoid valve 108 is opened. Thus, the refrigerant flows into the heat absorber 111 and evaporates to cool the air circulating in the air flow passage 113.

Figure 14:
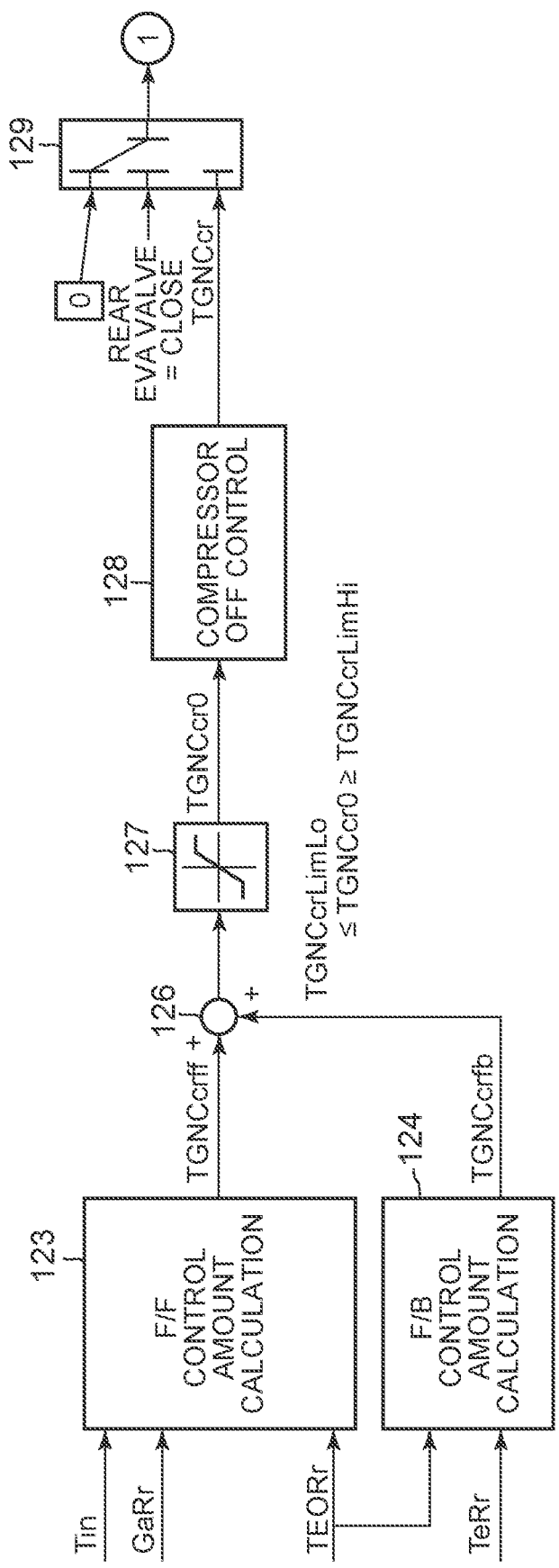
FIG. 14 is a control block diagram to explain the calculation of the compressor target number of revolutions based on the temperature of a heat absorber 111 of the air conditioner for the vehicle of FIG. 12.

After that, when the heat absorber temperature TeRr drops to the lower limit value TeRrLL (when it falls below the lower limit value TeRrLL or when it becomes TeRrLL or less. The same applies hereinafter), the solenoid valve 108 closed. Thereafter, such opening and closing of the solenoid valve 108 is repeated to control the heat absorber temperature Tear to the target heat absorber temperature TEORr to cool the rear part of the vehicle interior, (4-2) Control of Compressor. 2 by Heat Absorber. Temperature Tear of Heat Absorber 111 for Rear Scat Next, FIG. 14 is a control block diagram to calculate a target number of revolutions (compressor target number of revolutions) TGNCcr of the compress r 2 based on the heat absorber temperature TeRr. An F/F (FeedForward) control amount calculation section 123 of the heat pump controller 32 calculates an F/F control amount TGNCcrff of the compressor target number of revolutions on the basis of an indoor air temperature Tin, an air volume GaRr (which may be a blower voltage BLVRr of the indoor blower 118) of the air circulating in the air flow passage 113, and the target heat absorber temperature TEORr which is the target value of the heat absorber temperature TeRr.

Further, an F/B (FeedBack) control amount calculation section 124 calculates an F/B control amount TGNCcrfb of the compressor target number of revolutions by PID (proportional integral differentiation) calculation or PI (proportional integral) calculation based on the target heat absorber temperature TEORr and the heat absorber temperature TeRr. Then, the F/F control amount TGNCcrff calculated by the F/F control amount calculation section 123 and the F/B control amount TGNCcrfb calculated by the F/B control amount calculation section 124 are added by an adder 126 to be input to a limit setting unit 127.

In the limit setting unit 127, the above result of addition is added with limits of a lower limit number of revolutions TGNCcrLimLo of controlling and an upper limit number of revolutions TGNCcrLimHi thereof to be set as TGNCcr0, followed by being determined as a compressor target number of revolutions TGNCcr through a compressor OFF control section 128. Incidentally, since the F/P, control amount TGNCcrfb is not obtained at the start of operation, the F/F control amount TGNCcrff is determined as the compressor target number of revolutions TGNCcr. The determined compressor target number of revolutions TGNCcr enters one input of 129 denoted as a switcher.

In the embodiment, "0" is input to the other input, of the switcher 129. The switcher 129 selects and outputs "0" when the solenoid valve 108 (rear EVA valve) is closed (TGNCcr=0), and outputs TGNCcr when the solenoid valve 108 is open. This TGNCcr is the target number of revolutions of the compressor 2 (target number of revolutions corresponding to the heat absorber 111), which is required to control the heat absorber temperature TeRr. Then, the output of the switcher 129 is also input to the maximum value selection unit 102 of FIG. 9 (indicated by a broken line in FIG. 9).

In the case of this embodiment, the maximum value selection unit 102 selects the maximum value from the input respective values of the compressor target numbers of revolutions TGNCc, TGNCcb, and TGNCcr, and outputs the maximum value as a compressor target number of revolutions TGNC. Similarly, the heat pump controller 32 controls the operation (the number of revolutions) of the compressor 2 by the compressor target number of revolutions TGNC selected by the maximum value selection unit 102.

(4-3) Determination of Compressor Target Number of Revolutions TGNC when there is Heat Absorber 111 for Rear Seat Next, referring to the flowchart of FIG. 15, description will be made as to determination control of the target number of revolutions (compressor target number of revolutions) TGNC of the compressor 2 based on the heat medium temperature Tw, the heat absorber temperature Te, and the heat absorber temperature TeRr by the heat pump controller 32 in this embodiment.

Figure 15:
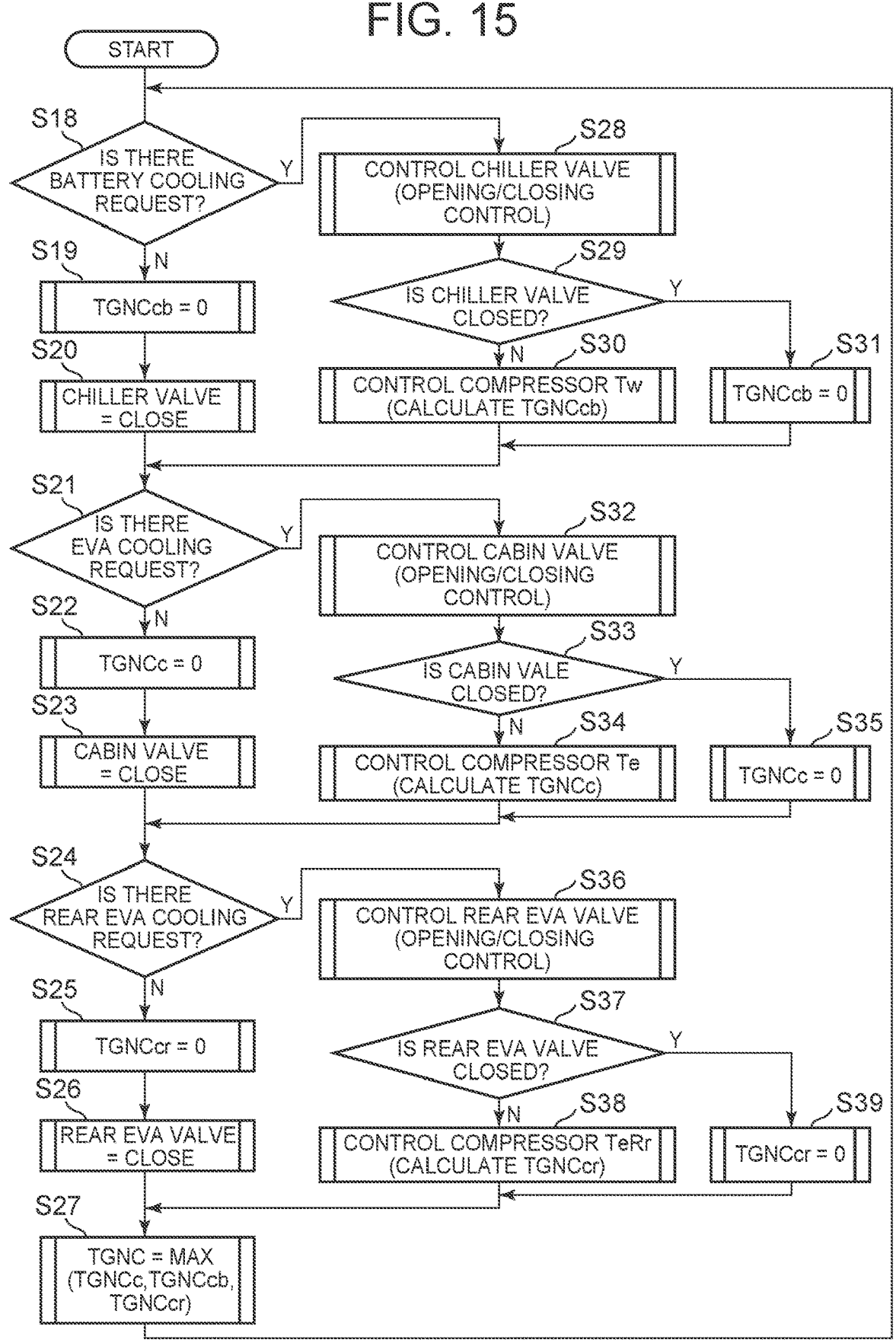
FIG. 15 is a flowchart to explain decision control of the compressor target number of revolutions based on a heat medium temperature Tw, a heat absorber temperature Te, and a heat absorber temperature TeRr in the air conditioner for the vehicle of FIG. 12.

The heat pump controller 32 judges in Step S18 of FIG. 15 whether or not the above-mentioned battery cooling request has been input from the battery controller 73. When there is no battery cooling request in Step S18, the heat pump controller 32 proceeds to Step S19 to set the compressor target number of revolutions TGNCcb to "0", closes the solenoid valve 69 (chiller valve) in Step S20, and proceeds to Step S21.

On the one hand, when the battery cooling request is made in Step S18, the heat pump controller 32 proceeds to Step S28 to enter the cooperative mode and executes the opening closing control of the solenoid valve 69 (chiller valve) of FIG. 7 described above. Next, in Step S29, it is judged whether or not the solenoid valve 69 is closed. Then, when the solenoid valve 69 is open, the heat pump controller proceeds to Step S30 to calculate the compressor target number of revolutions TGNCcb based on the heat medium temperature Tw in the control block of FIG. 9, and to change the switcher 103 so as to output the compressor target number of revolutions TGNCcb.

On the other hand, when the solenoid valve 69 is closed in Step S29, the heat pump controller proceeds to Step S31 to stop the calculation of the compressor target number of revolutions TGNCcb based on the heat medium temperature Tw in the control block of FIG. 9, and to change the switcher 103 so as to output "0" (TGNCcb=0), and proceeds to Step S21.

Incidentally, in this embodiment, when there is no battery cooling request and the heat pump controller proceeds from Step S18 to Step S19 and to Step S21 through Step S20, the cooling mode of the air conditioning operation is executed thereafter.

Then, the heat pump controller 32 judqes in Step S21 of FIG. 15 whether an EVA cooling request has been input from the air conditioning controller 45. The EVA cooling request in this embodiment is the same as the air conditioning request described above, but it is assumed that it means that for example, the air conditioning switch (air conditioner ON switch) for the front seat provided in the air conditioning operating unit 53 is pressed and the cooling mode is selected, so that cooling (air-conditioning) by the heat absorber 9 for the front seat is required.

When the EVA cooling request has not been transmitted to the heat pump controller 32 in Step S21, the heat pump controller 32 proceeds to Step S22 to set the compressor target number of revolutions TGNCc to "0", closes the solenoid valve 35 (cabin valve) in Step S23, and proceeds to Step S24.

On the one hand, when the EVA cooling request is made in Step S21, the heat pump controller 32 proceeds to Step S32 to execute the opening/closing control of the solenoid valve 35 (cabin valve) of FIG. 5 described above. Next, in Step S33, it is judged whether or not the solenoid valve 35 is closed. Then, when the solenoid valve 35 is open, the heat pump controller proceeds to Step S34 to calculate the compressor target number of revolutions TGNCc based on the heat absorber temperature Te in the control block of FIG. 9 and to change the switcher 101 so as to output the compressor tamer number of revolutions TGNCc.

On the other hand, when the solenoid valve 35 is closed in Step S33, the heat pump controller proceeds to Step S35 to stop the calculation of the compressor target number of revolutions TGNCc based on the heat absorber temperature Te in the control block of FIG. 9, and to change the switcher so as to output "0" (TGNCc=0), and proceeds to Step S24.

Then, the heat pump controller 32 judges in Step S24 of FIG. 15 whether a rear. EVA cooling request has been input from the air conditioning controller 45. The rear EVA cooling request in this embodiment is assumed to mean that the air conditioning switch (air conditioner ON switch) for the rear seat provided in the above-described air conditioning operating unit 53 is pressed and the cooling mode is selected, so that cooling (air-conditioning) by the heat absorber 111 for the rear seat is required.

When the rear EVA cooing request has not been transmitted to the heat pump controller 32 in Step S24, the heat pump controller 32 proceeds to Step S25 to set the compressor target number of revolutions TGNCcr to "0", closes the solenoid valve 188 (rear EVA valve) in Step S26, and proceeds to Step S27.

On the one hand, when the rear EVA cooling request is made in Step S24, the heat pump controller 32 proceeds to Step S36 to execute the opening/closing control of the solenoid valve 108 (rear EVA valve) of FIG. 13 described above. Next, in Step S37, it is judged whether or not the solenoid valve 188 is closed. Then, when the solenoid valve 108 is open, the heat Pump controller proceeds to Step S38 to calculate the compressor target number of revolutions TGNCcr based on the heat absorber temperature TeRr in the control block of FIG. 14 and to change the switcher 129 so as to output the compressor target number of revolutions TGNCcr.

On the other hand, when the solenoid valve 106 is closed in Step S37, the heat pump controller proceeds to Step 39 to stop the calculation of the compressor target number of revolutions TGNCcr based on the heat absorber temperature Tear in the control block of FIG. 14, and to change the switcher 129 so as to output "0" (TGNCcr=0), and proceeds to Step S27.

Then, in Step S27, the heat pump controller 32 selects the maximum value among the compressor target numbers of revolutions TGNCc, TGNCcb, and TGNCcr by the maximum value selection unit 102, and determines the same as the compressor target number of revolutions TGNC. Incidentally, when all the solenoid valves 69, 35, and 108 are closed, the compressor target numbers of revolutions TGNCc, TGNCcb, and TGNCcr are all set to "0" in Steps S31, S35, and S39, so that the compressor 2 is stopped where the air conditioning operation is the cooling mode.

Further, in terms of the compressor target number of revolutions TGNCc or TGNCcb or TGNCcr which was not the maximum value in the judgment of Step 327, the heat pump controller 32 stops the integral calculation in the F/B control amount calculation section 87 or 93 or 124 in FIG. 9 and FIG. 14.

As described above, in this embodiment, the heat pump controller 32 calculates each of the target numbers of revolutions TGNCc, TGNCcb, and TGNCcr of the compressor 2 required to control the temperature of the heat absorber 9, the temperature of the heat medium cooled by the refrigerant heat medium heat exchanger 64, and the temperature of the heat absorber 111, and selects the maximum value of them to control the operation of the compressor 2. Therefore, in the air conditioner 1 for the vehicle having the three evaporators like the heat absorber 9 for the front seat, the refrigerant-heat medium heat exchanger 64, and the heat absorber 111 for the rear seat, even if the load in them fluctuates, the inconvenience that the shortage of the cooling capacity occurs in all of them is eliminated, and the vehicle interior air conditioning by the heat absorber 9 or the heat absorber 111 and the cooling control f the battery 55 the refrigerant-heat medium heat exchanger 64 can be appropriately realized.

In this case as well, since the solenoid valves 35, 69, and 108 are provided and controlled based on the heat absorber temperature Te, the heat medium temperature Tw, the heat absorber temperature TrRr, and the presence or absence u of the cooling request due to them, it is possible to appropriately perform the cooling control by the heat absorber 9, the refrigerant-heat medium heat exchanger 64, and the heat absorber 111.

Also, in this embodiment as well, when the solenoid valve 35, the solenoid valve 69, and the solenoid valve 108 are open, the heat pump controller 32 calculates the compressor target numbers of revolutions TGNCc, TGNCcb, and TGNCcr corresponding to the heat absorber 9, the refrigerant-heat medium heat exchanger 64, and the heat absorber ill corresponding to them. Therefore, the solenoid valves 35. The solenoid valve 69, or the solenoid valve 108 is closed. In terms of those which do not need to generate the cooling action, the target number of revolutions is not calculated and unnecessary arithmetic processing by the heat pump controller 32 can be eliminated.

Further, when the solenoid valve 35, the solenoid valve 69 or the solenoid valve 108 is closed, the heat pump controller 32 sets the compressor target number of revolutions TGNCc, TGNCcb or TGNCcr to 0. Therefore, it is possible to reliably avoid the inconvenience of selecting the compressor target numbers of revolutions TGNCc, TGNCcb, and TGNCcr corresponding to the heat absorber 9, the refrigerant-heat medium heat exchanger 64, and the heat absorber 11 which do not need to generate the cooling action.

In addition, since the heat pump controller 32 stops the integral calculation in the calculation of the compressor target numbers of revolutions TGNCc, TGNCcb, and TGNCcr which are not the maximum values, the deterioration of controllability can similarly be avoided in advance.

In this case as well, since the heat pump controller 32 selects the maximum value of the F/F control amounts TGNCcff, TGNCcbff, and TGNCcrff at the start of operation to control the operation of the compressor 2, it is possible to eliminate the inconvenience that the shortage of the cooling capacity occurs in the heat absorber 9, the refrigerant heat medium heat exchanger. 64, and the heat absorber 111 from the start of operation and to realize appropriate temperature control by them.

Incidentally, in this embodiment as well, it assumed that the heat pump controller 32 performs the battery alarm control of the above-described embodiment. That is, when the battery alarm is input, the heat pump controller 32 closes and fixes the solenoid valve 35 and the solenoid valve 108, and opens and fixes the solenoid valve 69.

Also, in each of the above-described embodiments, the heat medium temperature Tw is adopted as the temperature of the target (heat medium) to be cooled by the refrigerant heat medium heat exchanger 64 (heat exchanger for the temperature-controlled object), but the battery temperature bell may be adopted as the temperature of the target to be cooled by the refrigerant-heat medium heat exchanger 64 (heat exchanger for the temperature-controlled object). The temperature of the refrigerant-heat medium heat exchanger 64 (the temperature of the refrigerant-heat medium heat exchanger 64 itself, the temperature of the refrigerant flowing out from the refrigerant flow passage 64B, etc.) may be adopted as the temperature of the refrigerant-heat medium heat exchanger 64 (heat exchanger for the temperature-controlled object).

Further, in the embodiment, the temperature of the battery 55 is controlled by circulating the heat medium, but the present invention is not limited to it, and the heat exchanger for the temperature-controlled object which directly exchanges heat between the refrigerant and the battery 55 (the target for temperature control) may be provided. In that case, the battery temperature bell becomes the temperature of the target to be cooled by the heat exchanger for the temperature control.

Furthermore, in the embodiment, the solenoid valve 35, the solenoid valve 69, and the solenoid valve 108 are respectively used as the valve device in the present invention, but when the indoor expansion valve 6, the auxiliary expansion valve 68, and the indoor expansion valve 107 are respectively constituted of a fully closable flow rate control valve (electric valve), the respective solenoid valves 35, 69, and 108 become unnecessary, and the indoor expansion valve 3, the auxiliary expansion valve 68, and the indoor expansion valve 107 become the valve devices in the present invention.

Additionally, in each embodiment, the compressor target number of revolutions TGNCcb is set to "0" when the solenoid valve 69 is closed. (Steps S6 and S31), the compressor target number of revolutions TGNCc is set to "0" when the solenoid valve 35 is closed (Steps S10 and S35), and the compressor target number of revolutions TGNCcr is set to "0" when the solenoid valve 108 is closed (Step S39), but the present invention is not limited to them. They may be respectively adopted as a lower limit number of revolutions (control lower limit value) of controlling, or the current value may be maintained.

Additionally, in the embodiment 1, the heat absorber 9 for the front seat and the refrigerant-heat medium heat exchanger 64 are adopted as the evaporators in the present invention, and in the embodiment 2, the heat absorber 111 for the rear seat is taken up as the evaporator in addition to that. However, the present invention is not limited thereto, and in the embodiment 1, a combination of the heat absorber 9 and the heat absorber 111 or a combination of the refrigerant-heat medium heat exchanger 64 and the heat absorber 111 may be used. That is, the present invention is also effective for an air conditioner for a vehicle having evaporators having such a combination.

Additionally, it goes without saying that the configuration and numerical values of the refrigerant circuit R described in the embodiments are not limited thereto, and cap be changed within the scope not departing from the spirit of the present Invention. Furthermore, in the embodiment, the present invention has been described in the air conditioner 1 for the vehicle having each operation mode such as the heating mode, the dehumidifying and heating mode, the dehumidifying and cooling mode, the cooling mode, the cooperative mode, and the battery cooling single mode, but is not limited to that. The present invention is also effective for an air conditioner for a vehicle capable of executing, for example, the cooling mode, the cooperative mode, and the battery cooling single mode.

DESCRIPTION OF REFERENCE NUMERALS 1 air conditioner for vehicle
2 compressor
3, 113 air flow passage
4 radiator
6 outdoor expansion valve
7 outdoor heat exchanger
8, 107 indoor expansion valve
9 heat absorber (evaporator, heat absorber for front seat)
11 control device
32 heat pump controller (constituting part of control device)
35, 69, 108 solenoid valve (valve device)
45 air conditioning controller (constituting part of control device)
55 battery (temperature-controlled object)
61 equipment temperature adjusting device
64 refrigerant-heat medium heat exchanger (evaporator, heat exchanger for temperature-controlled object)
68 auxiliary expansion valve
72 vehicle controller
73 battery controller
77 battery temperature sensor
76 heat medium temperature sensor
111 heat absorber (evaporator, heat absorber for rear seat)
R refrigerant circuit.

The invention claimed is:

1. An air conditioner for a vehicle, comprising at least:
a compressor to compress a refrigerant;
a plurality of evaporators to evaporate the refrigerant;
a plurality of valve devices to control the flow of the refrigerant into each of the evaporators; and
a control device, conditioning air of a vehicle interior,
wherein the control device calculates each of target numbers of revolutions of the compressor required to control the temperature of each of the evaporators or an object to be cooled by the evaporator, and selects the maximum value among a plurality of the target numbers of revolutions calculated corresponding to the respective evaporators to control the operation of the compressor,
wherein the control device controls the valve device on the basis of the temperature of each evaporator or the object to be cooled by the evaporator, or the presence or absence of a cooling request by each evaporator,
wherein the valve device is an opening/closing valve or a fully closable flow rate control valve,
wherein when the valve device is open, the control device calculates the target number of revolutions corresponding to the evaporator whose flow of the refrigerant is controlled by the valve device, and
wherein when the valve device is closed, the control device maintains the target number of revolutions corresponding to the evaporator whose flow of the refrigerant is controlled by the valve device at zero, or a control lower limit value, or a current value.

2. The air conditioner for the vehicle according to claim 1, wherein in calculating the target number of revolutions, the control device performs feedback calculation based on a temperature of each of the evaporators or the object to be cooled by the evaporator and the control device includes integral calculation in the feedback calculation, and in calculating the target number of revolutions which is not the maximum value, the control device stops the integral calculation.

3. The air conditioner for the vehicle according to claim 2, wherein in calculating the target number of revolutions, the control device performs feedforward calculation based on a target temperature of each of the evaporators or the object to be cooled by the evaporator, and
wherein at a start of operation, the control device selects the maximum value among the target numbers of revolutions of the compressor corresponding to each of the evaporators calculated by the feedforward calculation to control the operation of the compressor.

4. The air conditioner for the vehicle according to claim 1, wherein in calculating the target number of revolutions, the control device performs feedforward calculation based on a target temperature of each of the evaporators or the object to be cooled by the evaporator, and
wherein at a start of operation, the control device selects the maximum value among the target numbers of revolutions of the compressor corresponding to each of the evaporators calculated by the feedforward calculation to control the operation of the compressor.

5. The air conditioner for the vehicle according to claim 4, wherein the plurality of evaporators are any two or all of:
a front seat heat absorber to evaporate the refrigerant to cool air supplied to a front part of a vehicle interior,
a rear seat heat absorber to evaporate the refrigerant to cool the air supplied to a rear part of the vehicle interior, and
a heat exchanger for a temperature-controlled object to evaporate the refrigerant to cool the temperature-controlled object mounted on the vehicle.

6. The air conditioner for the vehicle according to claim 1, wherein the plurality of evaporators are any two or all of:
a front seat heat absorber to evaporate the refrigerant to cool air supplied to a front part of a vehicle interior,
a rear seat heat absorber to evaporate the refrigerant to cool the air supplied to a rear part of the vehicle interior, and
a heat exchanger for a temperature-controlled object to evaporate the refrigerant to cool the temperature-controlled object mounted on the vehicle.

7. The air conditioner for the vehicle according to claim 6, wherein the temperature-controlled object is a battery.

8. The air conditioner for the vehicle according to claim 1, wherein the plurality of evaporators include a heat exchanger for a temperature-controlled object to evaporate the refrigerant to cool the temperature-controlled object mounted on the vehicle, and
wherein when a temperature of the temperature-controlled object becomes equal to or higher than a predetermined upper limit value or becomes higher than an upper limit value, the control device fixes the valve device for controlling the flow of the refrigerant to the heat exchanger for the temperature-controlled object to an open state, and fixes the other valve devices to a closed state.

\* \* \* \* \*